US012744154B2

(12) United States Patent
Torii et al.

(10) Patent No.: US 12,744,154 B2
(45) Date of Patent: Sep. 22, 2026

(54) COIL DEVICE AND METHOD OF MANUFACTURING COIL DEVICE

(71) Applicant: Mitsubishi Electric Corporation, Tokyo (JP)

(72) Inventors: Yohei Torii, Tokyo (JP); Manabu Yoshino, Tokyo (JP); Yasuo Yamaguchi, Tokyo (JP); Takuichiro Shitomi, Tokyo (JP); Toshihiro Imasaka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 818 days.

(21) Appl. No.: 18/156,239

(22) Filed: Jan. 18, 2023

(65) Prior Publication Data

US 2023/0352232 A1 Nov. 2, 2023

(30) Foreign Application Priority Data

Mar. 31, 2022 (JP) ................................ 2022-059139

(51) Int. Cl.
*H01F 27/28* (2006.01)
*H01F 27/32* (2006.01)
(Continued)

(52) U.S. Cl.
CPC ....... *H01F 27/323* (2013.01); *H01F 27/2804* (2013.01); *H01F 41/041* (2013.01); *H01F 41/122* (2013.01)

(58) Field of Classification Search
CPC .. H01F 27/323; H01F 27/2804; H01F 41/041; H01F 41/122; H01F 41/042;
(Continued)

(56) References Cited

U.S. PATENT DOCUMENTS

2007/0199734 A1* 8/2007 Kudo .................. H05K 3/0052 29/25.35
2011/0075449 A1 3/2011 Fouquet
(Continued)

FOREIGN PATENT DOCUMENTS

EP 1 772 878 A1 4/2007
JP H10-135040 A 5/1998
(Continued)

OTHER PUBLICATIONS

An Office Action; mailed by the China National Intellectual Property Administration of the People's Republic of China on May 28, 2026, which corresponds to Chinese Patent Application No. 202310297567.9 and is related to U.S. Appl. No. 18/156,239.
(Continued)

*Primary Examiner* — Shawki S Ismail
*Assistant Examiner* — Kazi S Hossain
(74) *Attorney, Agent, or Firm* — Studebaker Brackett PLLC

(57) ABSTRACT

Provided is a coil device having a first coil and a second coil insulated by an insulating film, and deformation of the insulating film is suppressed. A coil device includes: a first insulating film provided in contact with a first direction side of a substrate; a spiral-shaped first coil part provided in contact with a first direction side of the first insulating film; a second insulating film provided to cover a first direction side of the first coil part and the first direction side of the first insulating film where the first coil part is not provided; a spiral-shaped second coil part provided in contact with a first direction side of the second insulating film; and a groove provided on a surface on the first direction side of the second insulating film in a region inside an outer peripheral edge of the second coil part in plan view.

16 Claims, 30 Drawing Sheets

(51) Int. Cl.
*H01F 41/04* (2006.01)
*H01F 41/12* (2006.01)

(58) Field of Classification Search
CPC .. H01F 41/125; H01F 2019/085; H01F 19/08; H01F 27/324; H01F 27/28; H01F 41/04
USPC ................................ 336/200, 232, 192, 198
See application file for complete search history.

(56) References Cited

U.S. PATENT DOCUMENTS

| | | | | |
|---|---|---|---|---|
| 2012/0112869 | A1* | 5/2012 | Nishikawa | H01F 17/0013 336/200 |
| 2019/0006088 | A1* | 1/2019 | Tomonari | H01F 27/2847 |

FOREIGN PATENT DOCUMENTS

| | | | |
|---|---|---|---|
| JP | 2006-318989 | A | 11/2006 |
| JP | 2007-273836 | A | 10/2007 |
| JP | 2008-218121 | A | 9/2008 |
| WO | 2013/166016 | A1 | 11/2013 |

OTHER PUBLICATIONS

Office Action issued in DE 10 2023 105 522.4; mailed by the German Patent and Trademark Office on Apr. 29, 2026.

* cited by examiner

101

101

103

COIL DEVICE AND METHOD OF MANUFACTURING COIL DEVICE

BACKGROUND OF THE INVENTION

Field of the Invention

The present disclosure relates to a coil device and a method of manufacturing a coil device.

Description of the Background Art

An insulating-type coil device is a coil device having a primary coil and a secondary coil provided across an insulating material from the primary coil and that transfers signals. In such a coil device, polyimide with film thickness corresponding to desired insulation breakdown voltage is used as an insulating material. The polyimide film easily deforms when the polyimide film is cured by heat, thus there is a problem that the size of the coil device needs to be large to obtain a region with small deformation on the upper surface of the film where a coil can be placed.

Japanese Patent Application Laid-Open No. 2008-218121 discloses a device for transferring signals having a primary side electrode (lower electrode) and a secondary side electrode (upper electrode) provided with interposition of a film of insulating material such as polyimide, and having a groove formed on a surface of the film of the insulating material around the upper electrode in plan view.

In the technology described in Japanese Patent Application Laid-Open No. 2008-218121, since the device have a primary coil being the primary side electrode and a secondary coil being the secondary side electrode and the groove is formed in the region outside the coil in plan view on the surface of the polyimide film, it may be difficult to suppress shrinkage of the polyimide.

SUMMARY

An object of the present disclosure is to provide a coil device with suppressed deformation of an insulating film on which a coil is placed, and a method of manufacturing the coil device.

A coil device according to the present disclosure includes: a substrate having a first main surface and a second main surface opposed to the first main surface; a first insulating film provided in contact with a first direction side of the substrate, with the first direction being a direction from the second main surface to the first main surface; a first coil part provided in contact with a first direction side of the first insulating film and being a spiral-shaped conductiv film in a plan view seen from a direction opposite to the first direction; a second insulating film provided to cover a first direction side of the first coil part and the first direction side of the first insulating film where the first coil part is not provided; a second coil part being a spiral-shaped conductive film in the plan view and provided in contact with a first direction side of the second insulating film; and at least one first groove provided on the second insulating film in a region inside an outer peripheral edge of the second coil part in the plan view and having a width in the first direction on a surface on the first direction side of the second insulating film.

A method of manufacturing a coil device according to the present disclosure includes: forming a first insulating film in contact with a first direction side of a substrate having a first main surface and a second main surface opposed to the first main surface, with the first direction being a direction from the second main surface to the first main surface; forming a first coil part being in contact with a first direction side of the first insulating film and being a spiral-shaped conductiv film in plan view seen from a direction opposite to the first direction after the forming of the first insulating film; forming a second insulating film to cover a first direction side of the first coil part and to be in contact with the first direction side of the first insulating film where the first coil part is not provided after the forming of the first coil part, and then forming an outer shape of the second insulating film; forming a second coil part being in contact with a first direction side of the second insulating film and being a spiral-shaped conductive in the plan view after the forming of the outer shape of the second insulating film; baking in which the second insulating film is heated and cured after the forming of the outer shape of the second insulating film or after the forming of the second coil part; and forming at least one groove having a width in the first direction on a surface on the first direction side of the second insulating film by etching, in a region inside an outer peripheral edge of the second coil part in the plan view, after the forming of the outer shape of the second insulating film and before the baking.

According to the present disclosure, a coil device, with deformation of a second insulating film reduced by arranging a groove in a region of the second insulating film inside an outer peripheral edge of a second coil part in plan view and thus by reducing and dispersing stresses due to shrinkage of the second insulating film, is obtained.

These and other objects, features, aspects and advantages of the present invention will become more apparent from the following detailed description of the present invention when taken in conjunction with the accompanying drawings.

DESCRIPTION OF THE PREFERRED EMBODIMENTS

In the present disclosure, a surface of a substrate that serves as a base of a coil device facing a direction in which a coil is arranged is referred to as a first main surface being an upper surface, and a surface opposite to the first main surface is referred to as a second main surface being a lower surface. Also, a direction from the second main surface to the first main surface is defined as a first direction (Z direction). Further, a direction parallel to the first main surface is defined as a second direction (X direction), and a direction perpendicular to the X direction and parallel to the first main surface is defined as a third direction (Y direction). Accordingly, the X direction, the Y direction, and the Z direction are perpendicular with each other. Also, as for each film that composes the coil device, a surface far from the substrate is referred to as an upper surface and a surface near the substrate is referred to as a lower surface. Also, plan view is, for example, a view in which an object is projected onto a plane viewed from a direction opposite to the first direction, namely a direction from the first main surface to the second main surface.

First Embodiment

Figure 1:
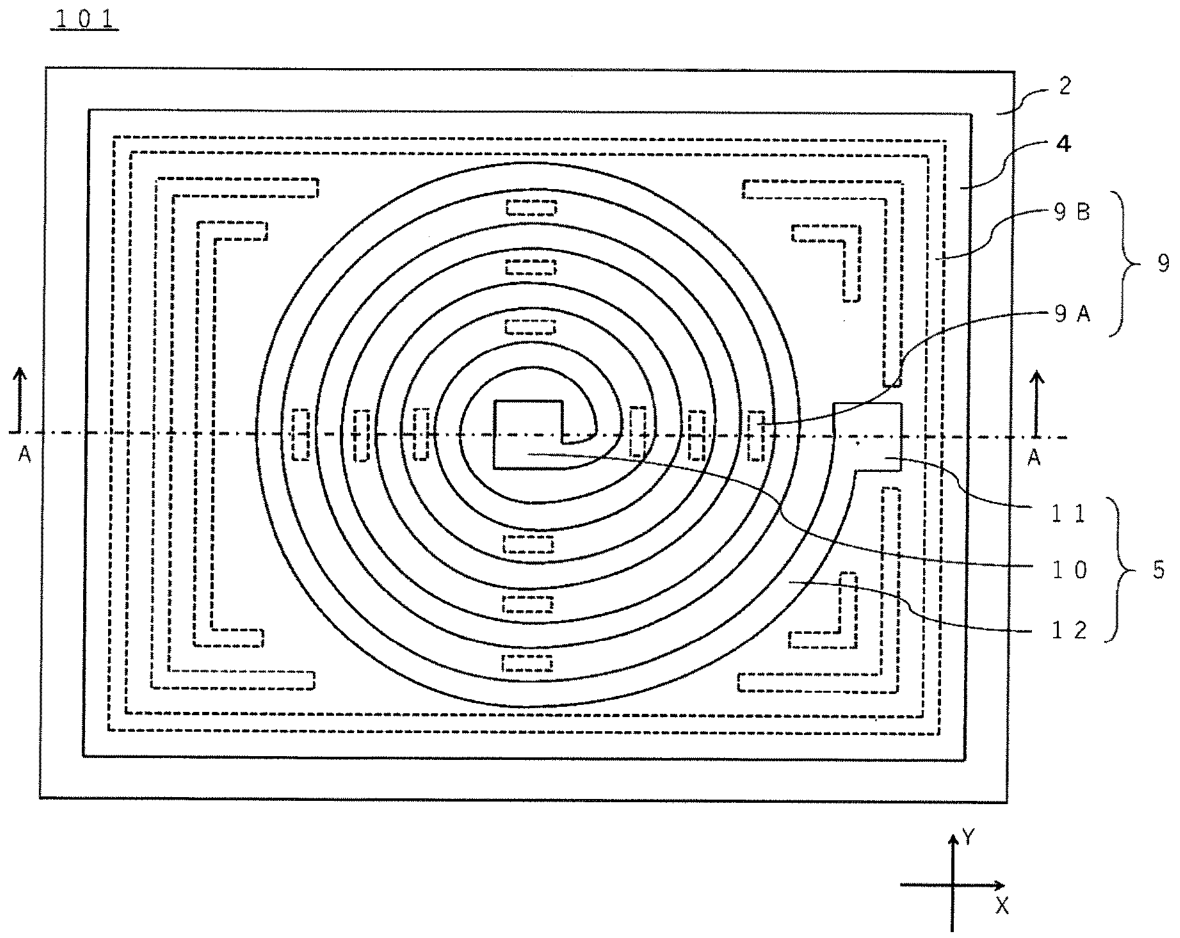
FIG. 1 is a plan view of an insulating-type coil device of a first embodiment.
Figure 2:
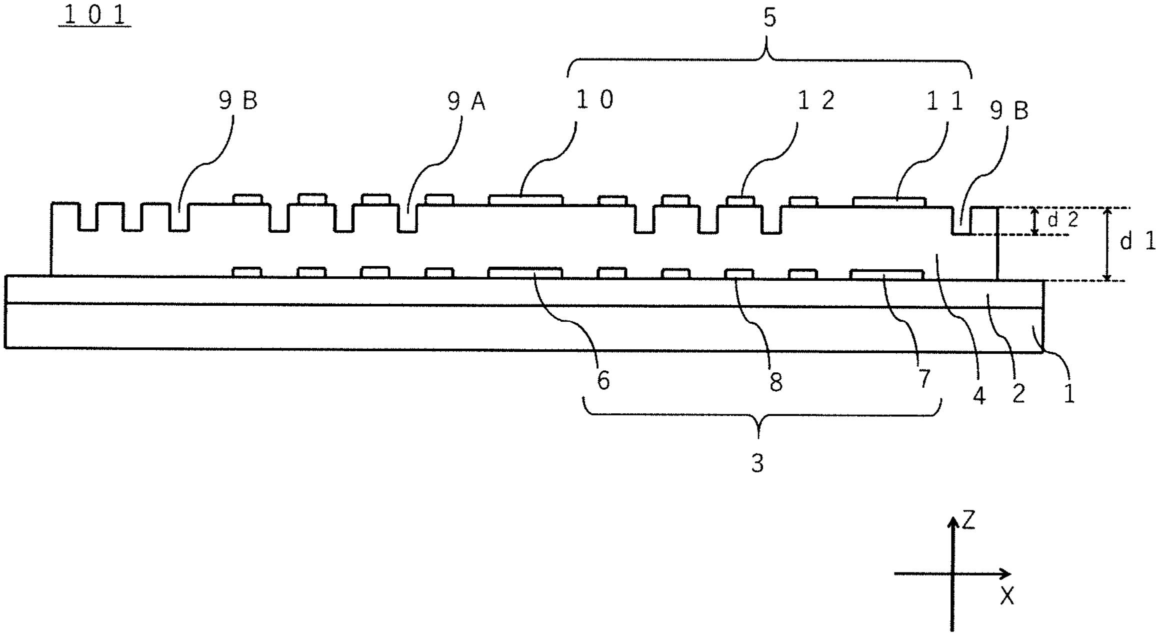
FIG. 2 is a cross-sectional view of the insulating-type coil device of FIG. 1.

FIG. 1 is a plan view showing an insulating-type coil device 101 of the first embodiment. Also, FIG. 2 is a cross-sectional view showing the cross section taken along the line A-A in FIG. 1 of the insulating-type coil device 101. As shown in FIG. 2, the insulating-type coil device 101 includes a substrate 1. The substrate 1 have the first main surface being the upper surface and the second main surface being the lower surface opposite to the first main surface. In the present disclosure, the direction from the second main surface to the first main surface is defined as the first direction. The insulating-type coil device 101 further includes: a first insulating film 2 provided in contact with the first direction side of the substrate 1; a primary coil 3 being a conductive film provided in contact with the first direction side of the first insulating film 2; a second insulating film 4 covering the first direction side of the primary coil 3 and in contact with the first direction side of the first insulating film 2 where a first coil part 8 is not provided; grooves 9 provided on the surface on the first direction side of the second insulating film 4 and having a width in the first direction; and a secondary coil 5 being a conductive film provided in contact with the surface on the first direction side of the second insulating film 4. The insulating-type coil device 101 is a device that transfers signals by magnetic coupling between the primary coil 3 and the secondary coil 5 arranged with interposition of the second insulating film 4.

The substrate 1 have an outer shape of a rectangle having sides parallel to the X direction and the Y direction. The substrate 1 is composed of silicon (Si). The substrate 1 may be, for example, a substrate composed of silicon carbide (SiC) or gallium nitride (GaN) or the like, or an insulating substrate composed of glass or ceramics or the like.

The first insulating film 2 is provided in contact with the upper surface of the substrate 1 to cover the upper surface of the substrate 1. The first insulating film 2 is composed of a silicon oxide film ($SiO_2$) being a semiconductor material. Note that the first insulating film 2 may be, for example, composed of a silicon nitride film ($Si_3N_4$).

Although the primary coil 3 is not shown in FIG. 1 as the primary coil 3 locates below the second insulating film 4, namely in the opposite side of the first direction with respect to the second insulating film 4, the primary coil 3 is provided in contact with the upper surface of the first insulating film 2 as shown in FIG. 2 and have a similar shape to the secondary coil 5 shown in FIG. 1 in plan view. In other words, the primary coil 3 is a conductive film provided in contact with the upper surface of the first insulating film 2, and the primary coil 3 is composed of: the first coil part 8 having a circular spiral shape in plan view; a first electrode 6 which is arranged in the center part of the first coil part 8 in plan view in connection to one end of the first coil part 8 and to which current is input; and a second electrode 7 which is arranged in the outer peripheral part of the first coil part 8 in plan view in connection to the other end of the first coil part 8 and from which the current is output. The material of the primary coil 3 is, for example, aluminum or copper, and the width in the first direction of the conductive film is, for example, 0.1 to 10 μm. Also, the width of the conductive film of the first coil part 8 in plan view is, for example, 1 to 20 μm.

The second insulating film 4 is a film having insulating property formed between the primary coil 3 and the secondary coil 5 for maintaining breakdown voltage, and desired performance with respect to the breakdown voltage corresponding to high voltage applied between the two coils is obtained by adjusting the film thickness. The second insulating film 4 is provided in contact with the region inside the outer shape of the upper surface of the first insulating film 2. The second insulating film 4 have rectangle outer shape having sides parallel to the X direction and the Y direction in outer peripheral edge in plan view. The second insulating film 4 is, for example, composed of polyimide being an insulating organic material. The grooves 9 having a width in the first direction is formed on the upper surface of the second insulating film 4. The grooves 9 will be described later.

The secondary coil 5 is provided in contact with the upper surface of the second insulating film 4 and have similar configuration to the primary coil 3. In other words, as shown in FIG. 1, the secondary coil 5 is a conductive film provided in contact with the upper surface of the second insulating film 4 and is composed of: a second coil part 12 having a circular spiral shape in plan view; a third electrode 10 which is arranged in the center part of the second coil part 12 in plan view in connection to one end of the second coil part 12 and to which current is input; and the fourth electrode 11 which is arranged in the outer peripheral part of the second coil part 12 in plan view in connection to the other end of the second coil part 12 and from which the current is output. The material of the secondary coil 5 is, for example, aluminum or copper, and the width in the first direction of the conductive film is, for example, 0.1 to 10 μm. Also, the width of the conductive film of the second coil part 12 in plan view is, for example, 1 to 20 μm. Note that although the primary coil 3 and the secondary coil 5 are described to have the same planar shape in the first embodiment, their configuration is not limited thereto. They may have different shape as long as they serve as coils, and their material or their width in the first direction may be different.

Here, the grooves 9 are described. In the first embodiment, as shown in FIG. 1, the grooves 9 include: grooves 9A being first grooves arranged inside the outer peripheral edge of the second coil part 12 in plan view and being arranged in the region between the adjacent conductive film on the inner side and on the outer side of the spiral shape of the second coil part 12; and grooves 9B being second grooves arranged in the region outside the outer peripheral edge of the second coil part 12, that is, the peripheral region of the second insulating film 4. Both of the grooves 9A and the grooves 9B are arranged in the position not overlapping the second coil part 12. In other words, the second coil part 12 is configured such that the second coil part 12 does not straddle steps between the upper surface of the second insulating film 4 where the grooves 9 are not provided and the bottom surface of the grooves 9. Further, both of the grooves 9A and the grooves 9B have straight parts extending in the direction parallel to the X direction or the Y direction. Here, the outer peripheral edge of the second coil part 12 refers to the second coil part 12 closest to the edge of the semiconductor device in plan view when viewed in a straight line in an arbitrary direction from the center of the third electrode 10 to the edge of the insulating-type coil device 101. Inside the outer peripheral edge refers to the area between the outer peripheral edge and the third electrode 10 on the lines connecting the outer peripheral edge and the third electrode 10. Although a plurality of the grooves 9A and a plurality of the grooves 9B are arranged respectively in FIG. 1, one groove 9A may be arranged and one groove 9B may be arranged.

Also, as shown in FIG. 2, the grooves 9A are arranged between the adjacent conductive film of the second coil part 12 in the cross-sectional view. With d1 being the width in the first direction of the second insulating film 4, namely the dimension in Z direction from the interface between the second insulating film 4 and the first insulating film 2 to the upper surface of the second insulating film 4, and with d2 being the width in Z direction of the grooves 9 provided on the upper surface of the second insulating film 4, d2 is less than or equal to 50% of d1. By setting d2 to a small value in this way, deterioration in insulating property between the first coil part 8 and the second coil part 12 is suppressed.

Figure 3:
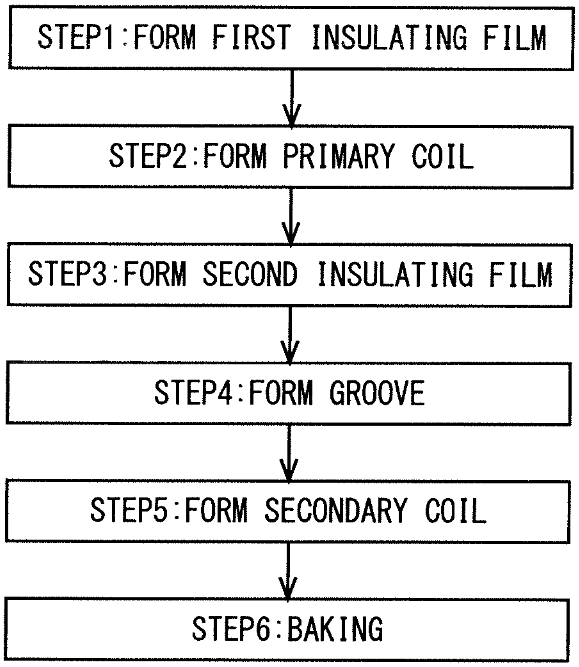
FIG. 3 is a flowchart showing a part of a manufacturing method of the insulating-type coil device of the first embodiment.

Next, a manufacturing method of the insulating-type coil device 101 of the first embodiment is described. FIG. 3 is a flowchart showing the manufacturing flow. Also, FIGS. 4 to 13 correspond to the cross section of the insulating-type coil device 101 shown in FIG. 2 and are cross-sectional views showing the same cross section in each manufacturing process.

Figure 4:
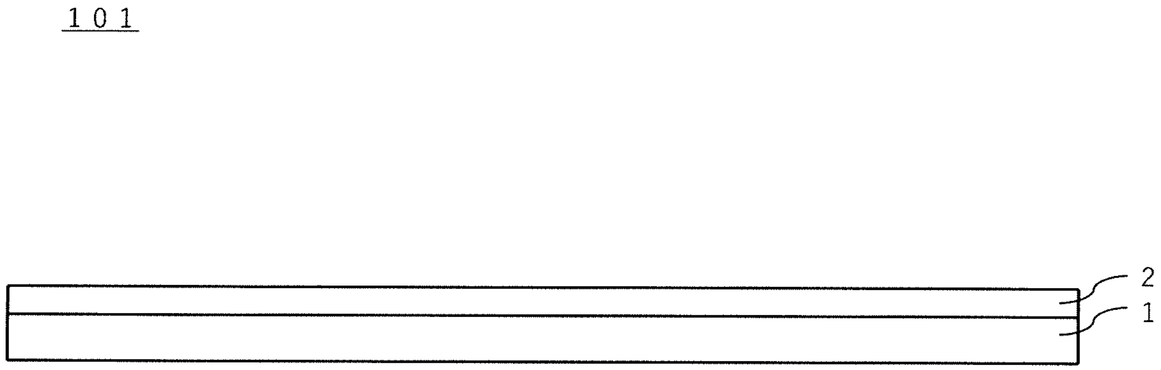
FIG. 4 is a cross-sectional view of the insulating-type coil device in a first insulating film forming process of the first embodiment.

First, in Step 1, the first insulating film 2 is formed in contact with the upper surface of the substrate 1. FIG. 4 is a cross-sectional view showing the cross section of the insulating-type coil device 101 after Step 1 is performed. The first insulating film 2 may be formed by vapor deposition using a thermal CVD equipment, for example.

Figure 5:
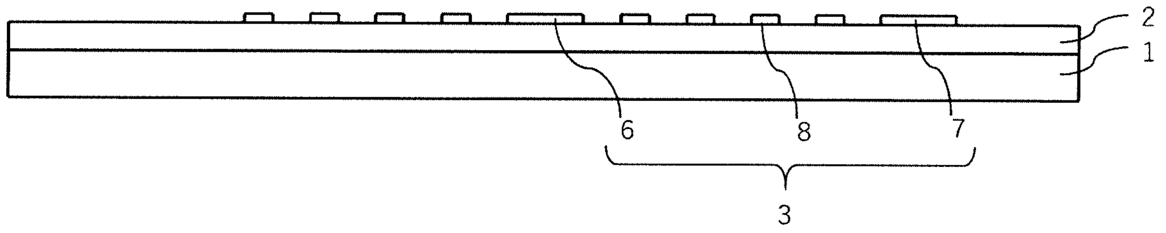
FIG. 5 is a cross-sectional view of the insulating-type coil device in a primary coil forming process of the first embodiment.

Next, in Step 2, the primary coil 3 is formed in contact with the upper surface of the first insulating film 2. FIG. 5 is a cross sectional view showing the cross section of the insulating-type coil device 101 after Step 2 is performed. The primary coil 3 is formed by forming a conductive film of aluminum, copper or the like to be a member on the upper surface of the first insulating film 2 by using a sputtering device or the like at first, for example, and then by using a processing technology of photolithography. The photolithography is a processing technology in which a pattern is formed through applying a photosensitive resist on the upper surface of a film and then exposing the resist by using a photomask having a desired pattern, developing the resist, etching, and removing the resist. In the photolithography in Step 2, the etching is dry etching or wet etching, for example.

Figure 6:
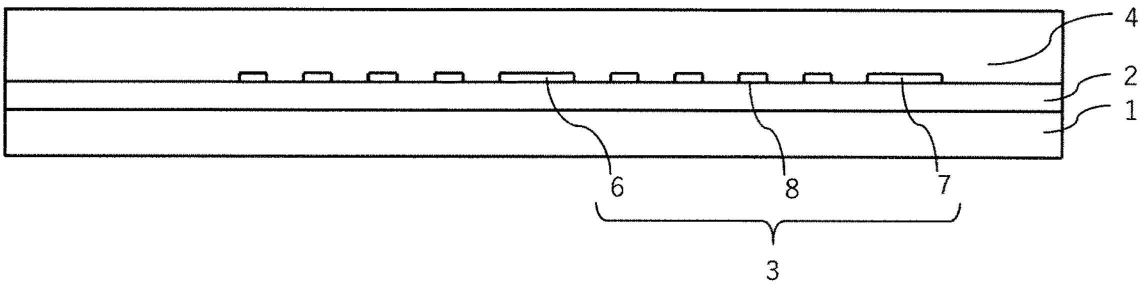
FIG. 6 is a cross-sectional view of the insulating-type coil device in a second insulating film forming process of the first embodiment.
Figure 7:
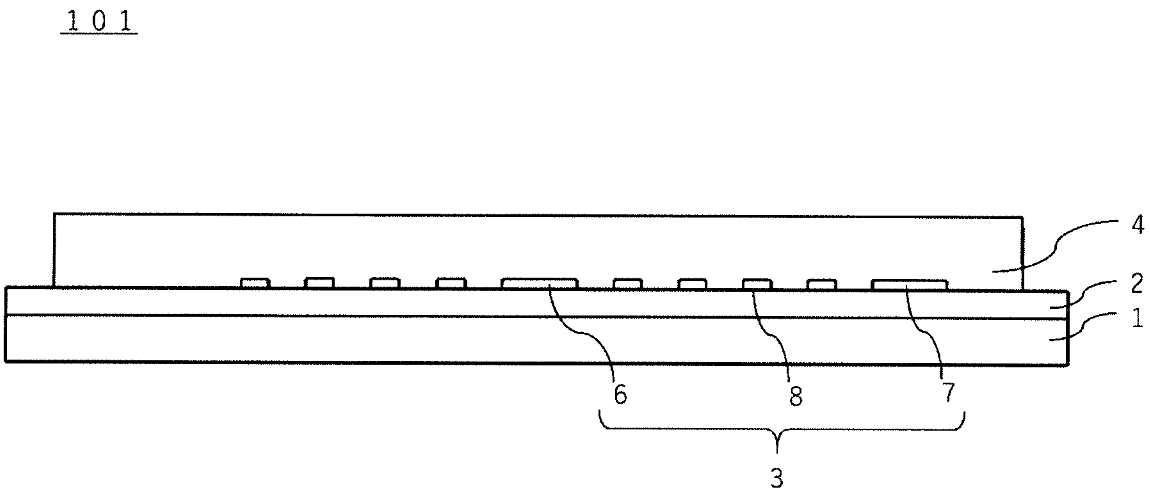
FIG. 7 is a cross-sectional view of the insulating-type coil device in the second insulating film forming process of the first embodiment.

Next, in Step 3, the second insulating film 4 is formed in contact with the upper surface of the first insulating film 2 on which the primary coil 3 is formed. FIG. 6 and FIG. 7 are cross-sectional views showing the cross section of the insulating-type coil device 101 in Step 3. The second insulating film 4 is composed of polyimide in the first embodiment. In the forming of the second insulating film 4, at first, polyimide is applied to cover the entire upper surface of the insulating-type coil device 101 (FIG. 6). Then, the outer peripheral part of the second insulating film 4 is removed by using a processing technology of photolithography, and a rectangle shape of the outer periphery is formed (FIG. 7). Although this processing technology of the photolithography is similar to that described in the description of Step 2, the etching in the photolithography in Step 3 is dry etching, for example.

Next, in Step 4, the grooves 9 are formed on the second insulating film 4. The grooves 9 are formed by using a processing technology of photolithography. FIGS. 8 to 12 are cross-sectional views showing the insulating-type coil device 101 in Step 4. At first, positive photosensitive resist

Figure 8:
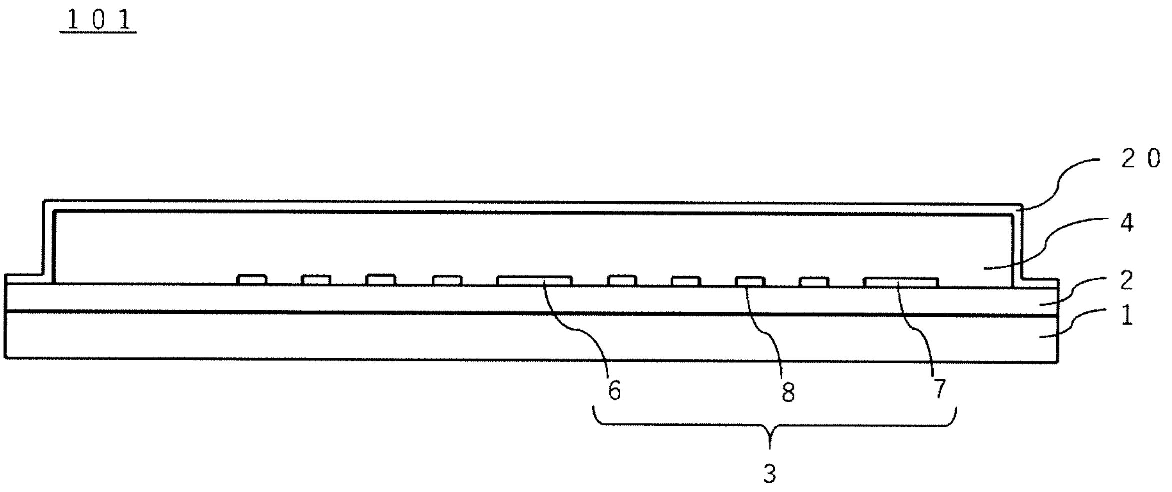
FIG. 8 is a cross-sectional view of the insulating-type coil device in a groove forming process of the first embodiment.
Figure 9:
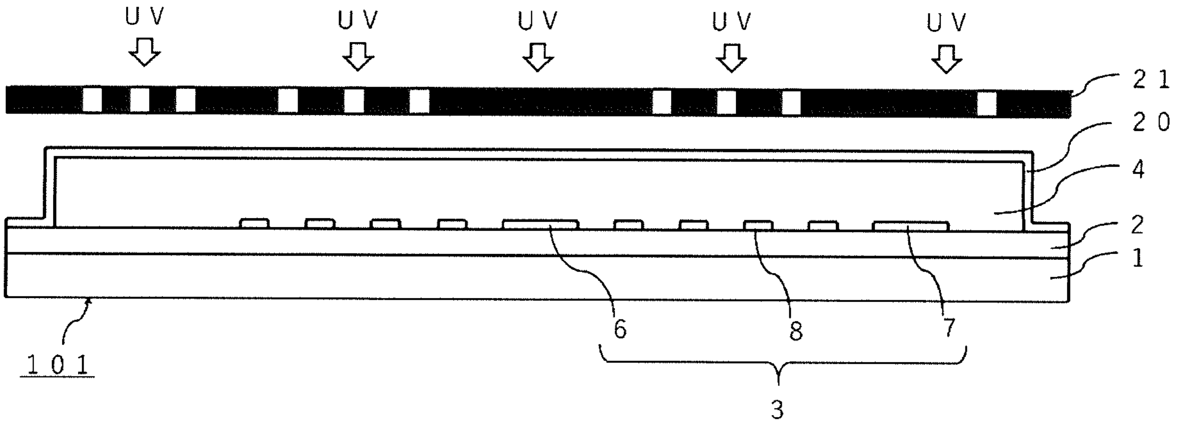
FIG. 9 is a cross-sectional view of the insulating-type coil device in the groove forming process of the first embodiment.
Figure 10:
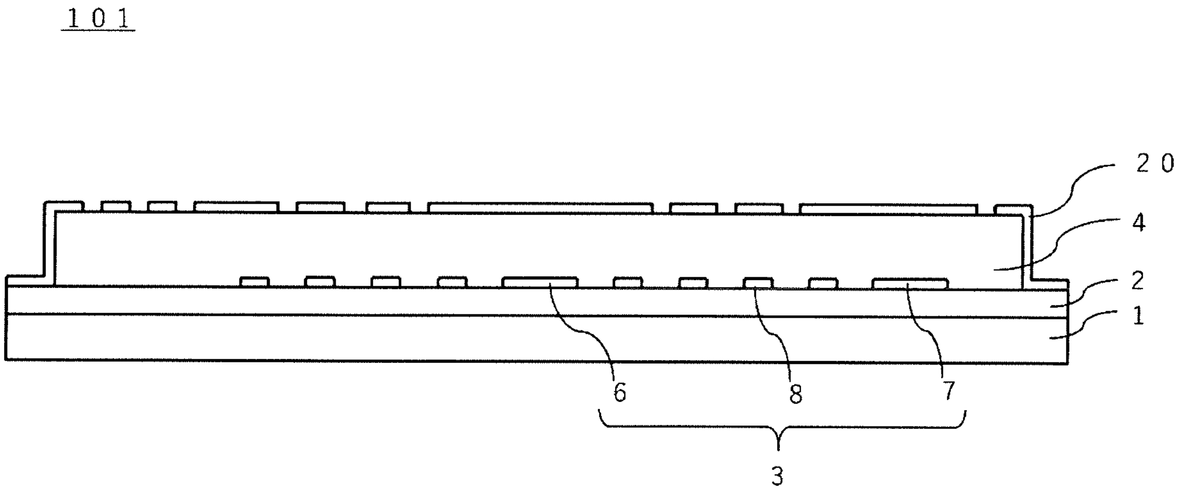
FIG. 10 is a cross-sectional view of the insulating-type coil device in the groove forming process of the first embodiment.
Figure 11:
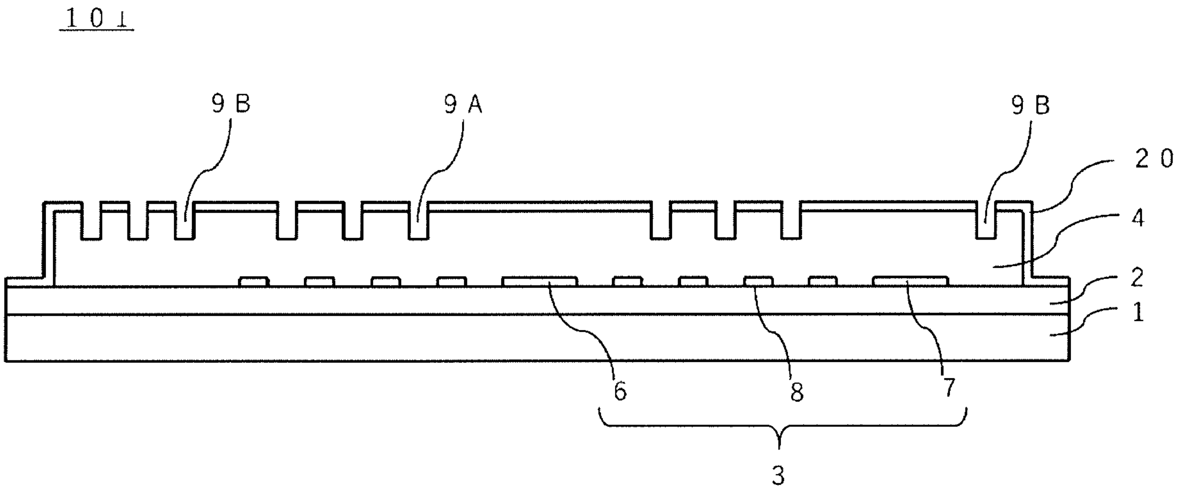
FIG. 11 is a cross-sectional view of the insulating-type coil device in the groove forming process of the first embodiment.
Figure 12:
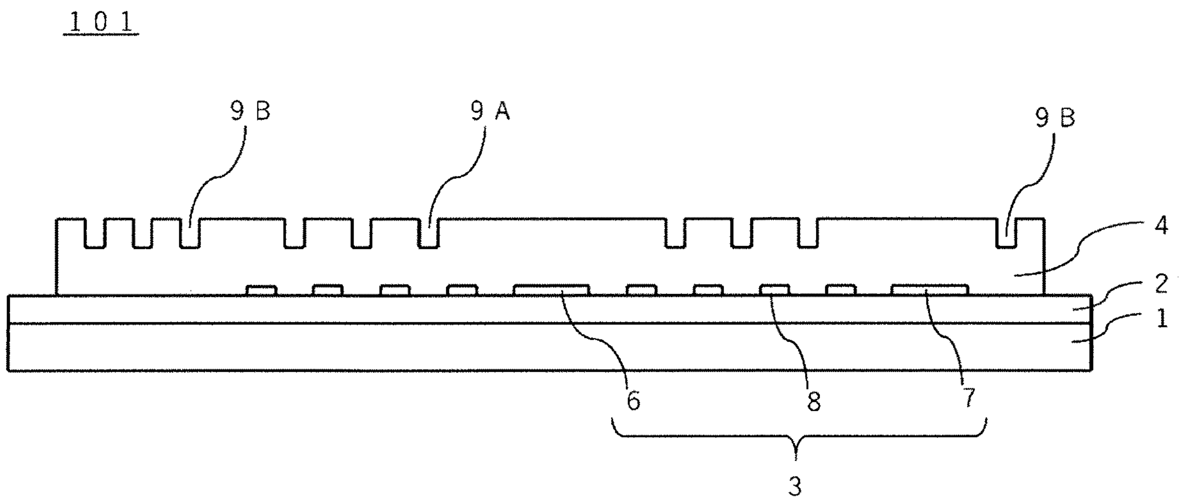
FIG. 12 is a cross-sectional view of the insulating-type coil device in the groove forming process of the first embodiment.

20 is applied to cover the entire upper surface of the insulating-type coil device 101 (FIG. 8). Next, the resist 20 is exposed to UV by using a photomask 21 in which a pattern of the grooves 9 are formed (FIG. 9). Next, the resist 20 is developed. Here, the region of the resist 20 exposed to the light is removed (FIG. 10). Next, the second insulating film 4 in the region where the resist 20 has been removed is dug up by etching (FIG. 11), and then the resist 20 is removed (FIG. 12). In the photolithography in Step 4, in etching the polyimide, anisotropic dry etching is used, for example.

Figure 13:
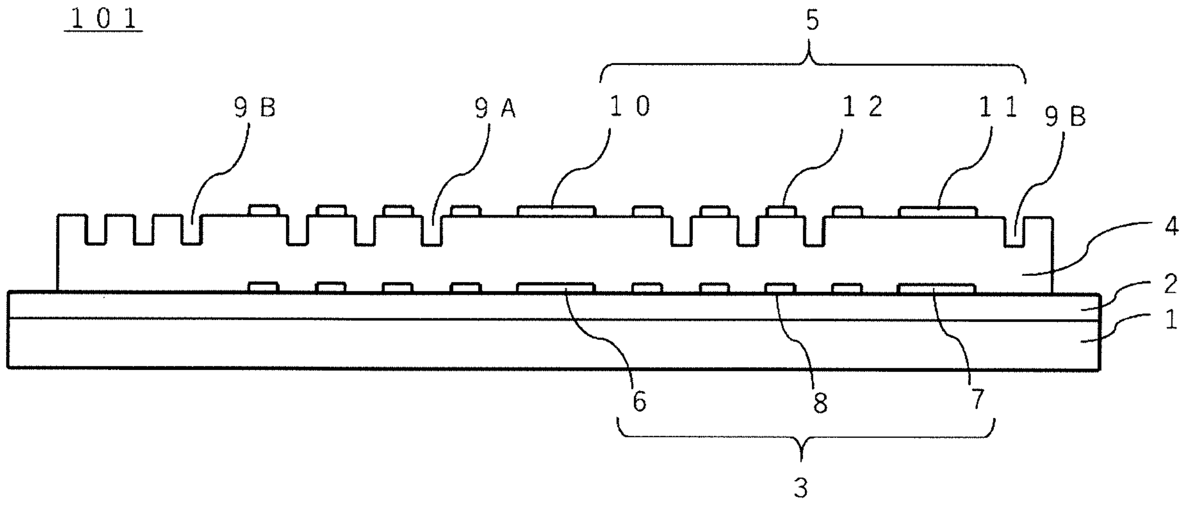
FIG. 13 is a cross-sectional view of the insulating-type coil device in a secondary coil forming process of the first embodiment.

In Step 5, the secondary coil 5 is formed in contact with the upper surface of the second insulating film 4. FIG. 13 is a cross-sectional view showing the insulating-type coil device 101 after performing Step 5. The secondary coil 5 is, for example, formed by forming a conductive film made of aluminum, copper or the like to be a member on the upper surface of the second insulating film 4 by using a sputtering device or the like at first, and then by applying a process of photolithography using a photomask in which a pattern of the secondary coil 5 is formed. This processing technology of the photolithography is similar to that described in the description of Step 2.

In Step 6, baking is performed in which the second insulating film 4 is heated at high temperature so as to thermally cure the second insulating film 4 and stabilize the film quality. The cross section after performing Step 6 is the same as that shown in FIG. 13.

Note that although the grooves 9 is formed in Step 4, and then the secondary coil 5 is formed in Step 5, and the baking is performed in Step 6 at last, order of these Steps 4 to 6 can be changed as long as the forming of the grooves is performed before the baking. Namely, the secondary coil 5 may be formed followed by the forming of the grooves 9 and then the baking may be performed (order of Step 5, Step 4, and Step 6), and the grooves 9 may be formed followed by the baking and then the secondary coil 5 may be formed (order of Step 4, Step 6, and Step 5).

Figure 14:
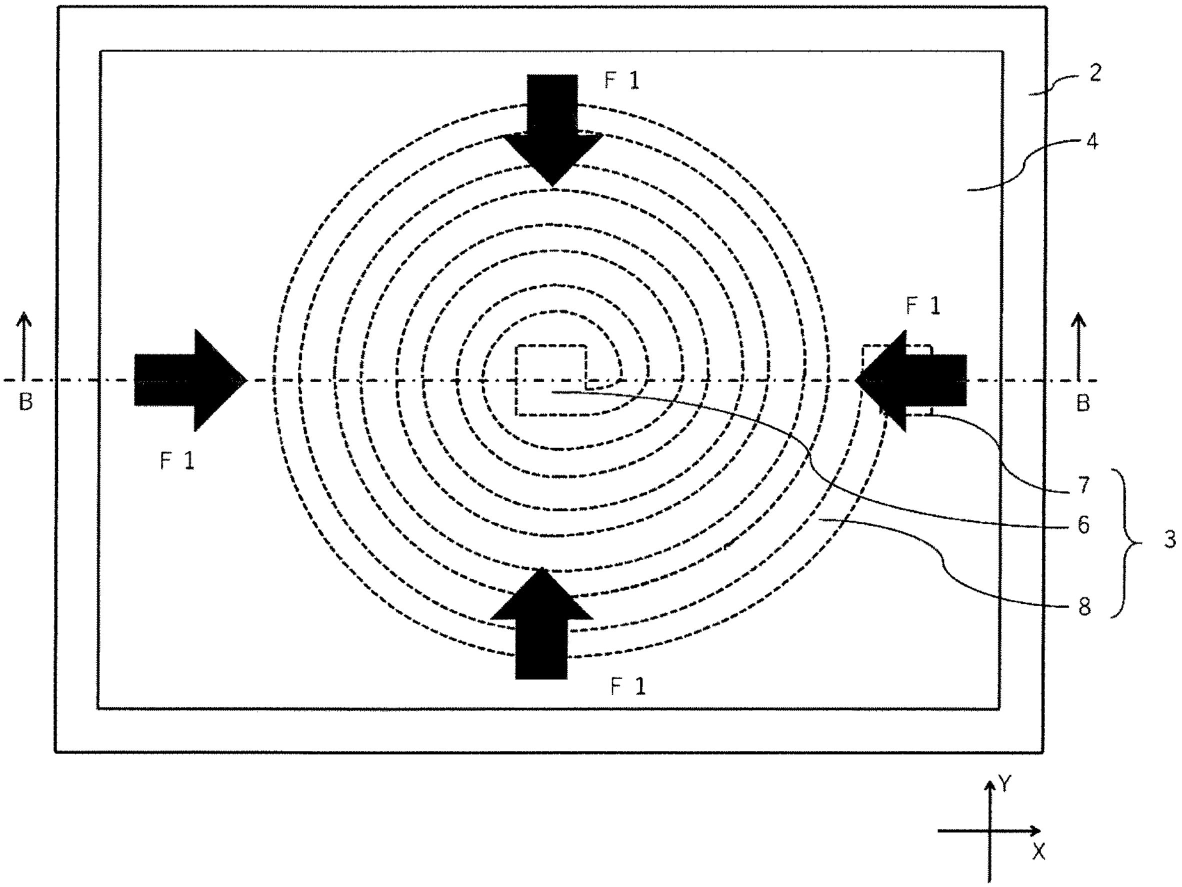
FIG. 14 is a plan view showing an overview of the insulating-type coil device.
Figure 15:
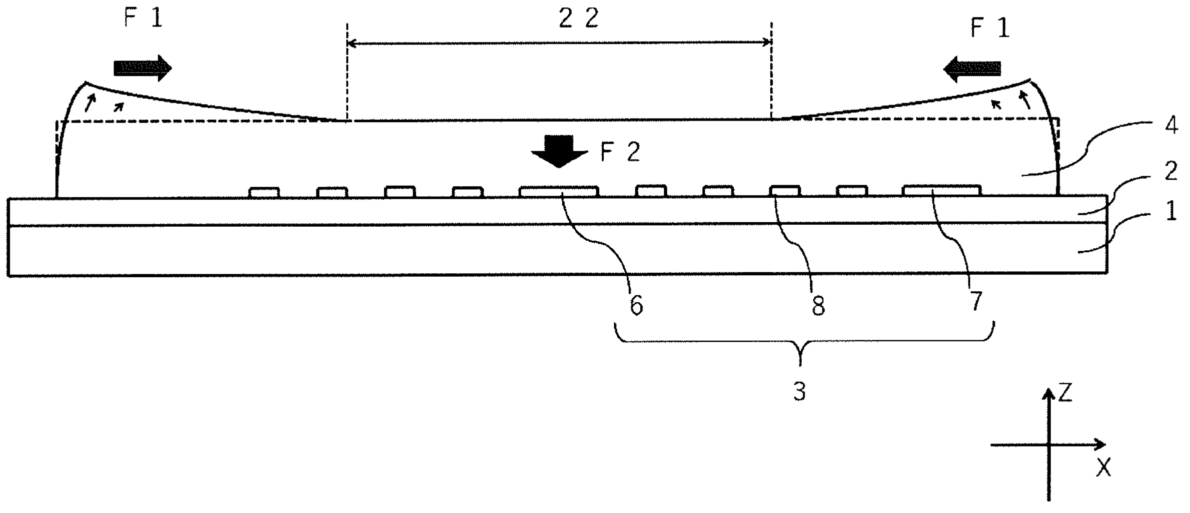
FIG. 15 is a cross-sectional view showing an overview of the insulating-type coil device.

Next, operations of the insulating-type coil device 101 of the first embodiment are described. First, an insulating-type coil device in which the grooves 9 are not arranged is described by using FIG. 14 and FIG. 15. FIG. 14 is a plan view schematically showing the insulating-type coil device when the baking at high temperature is performed in the baking process, and FIG. 15 is a cross-sectional view showing the cross section taken along the line B-B shown in FIG. 14. Note that the secondary coil 5 is not shown in FIG. 14 and FIG. 15 for simplicity. In the insulating-type coil device, curing and shrinkage of the second insulating film 4 occur when the baking at high temperature is performed in Step 6 of the manufacturing process described above. Due to the curing and shrinkage, with respect to the XY directions, stress F1 pointing from the outer peripheral edge of the second insulating film 4 to the center part of the second insulating film 4 in plan view is generated as shown in FIG. 14. Also, with respect to the Z direction, stress F2 pointing from the upper surface of the second insulating film 4 toward the first insulating film 2 in the cross-sectional view is generated as shown in FIG. 15. These F1 and F2 are referred to as shrinkage stresses.

The shape of the second insulating film 4 before the baking is as shown by the dashed lines in FIG. 15. On the other hand, when the curings of the second insulating film 4 that proceed from the outer peripheral part to the center part as the outer peripheral part become hot first are compounded to increase the shrinkage stresses, deformation that the outer peripheral part of the second insulating film 4 is raised toward the Z direction to be a protruding shape may occur. As a result, the flat region 22 which is the area of the upper surface of the second insulating film 4 where deformation has not occurred shrinks toward the center part of the second insulating film 4.

In the first embodiment, average thickness of the second insulating film 4 is decreased by providing the grooves 9 and the shrinkage stresses F1 and F2 are reduced. By arranging the grooves 9 inside the outer peripheral edge of the second coil part 12 in addition to outside the second coil part 12, effect of reducing the shrinkage stresses F1 and F2 is further increased and deformation of the second insulating film 4 is suppressed. At the same time, forming the grooves 9 such that they have straight parts extending in the direction parallel to the X direction and the Y direction divides the upper surface side of the second insulating film 4 and disperses the shrinkage stress F1. As a result, shrinkage of the flat region 22 by the deformation is further suppressed.

Next, effects of the insulating-type coil device 101 of the first embodiment are described. In the insulating-type coil device, to arrange the secondary coil 5 on the upper surface of the second insulating film 4, it is needed that the upper surface has no deformation and is a flat plane. Nevertheless, there is a problem that if deformation occurs in the outer peripheral part during the baking, the size of the insulating-type coil device should be increased in advance in accordance with the shrinkage of the flat region 22. In the insulating-type coil device 101 of the first embodiment, deformation of the second insulating film 4 is suppressed by arranging the grooves 9 inside the outer periphery of the second coil part 12 as described above. With this configuration, effects that the shrinkage of the flat region 22 on which the secondary coil 5 can be provided can be suppressed, the increase of the size of the device is suppressed, and downsizing is enabled are obtained. Also, by forming the grooves 9 such that the grooves 9 have straight parts extending in the X direction and the Y direction, which are directions parallel to the outer peripheral edge of the rectangle outer shape of the second insulating film 4, the shrinkage stresses of the second insulating film 4 are dispersed, and the deformation of the second insulating film 4 is further reduced to suppress the shrinkage of the flat region 22. Also, by forming the grooves 9 such that the grooves 9 do not intersect with the second coil part 12 when the grooves 9 are arranged in the region inside the outer periphery of the second coil part 12, thinning of the second coil part 12 in the step parts of the grooves 9 is reduced, and disconnection or increase in electrical resistance is suppressed.

In the first embodiment, the second insulating film 4 is a rectangle having sides parallel to the X direction and Y direction in plan view, and the grooves 9A, which are first grooves arranged inside the outer peripheral edge of the second coil part 12, and the grooves 9B, which are second grooves arranged outside the outer peripheral edge of the second coil part 12, have parts parallel to X direction and Y direction. In some cases, making the outer shape of the coil device a rectangle in consideration of processability of the outer shape or mounting workability afterward and accordingly making the second insulating film 4 a rectangle increase manufacturing workability. Nevertheless, the second insulating film 4 is not limited to a rectangle and may be any shape. Also, in a case where the second insulating film 4 is any shape including a rectangle, when at least either of the grooves 9A and the grooves 9B are formed such that each groove have a part extending in parallel direction to the outer peripheral edge of the second insulating film 4 closest to the groove, the shrinkage stresses pointing from the outer peripheral edge to the center part of the second insulating film 4 is dispersed and the deformation of the second insulating film 4 is further suppressed.

Second Embodiment

In the first embodiment, the insulating-type coil device 101, in which the outer shape of the second insulating film 4 is a rectangle and the grooves 9 extending in the directions parallel to the sides of the outer shape of the second insulating film 4 are formed on the upper surface of the second insulating film 4, is described. In the second embodiment, an insulating-type coil device 102 is described in which a spiral-shaped groove 13 is formed in the region between the adjacent conductive film on the inner side and on the outer side of the spiral shape of the second coil part.

Figure 16:
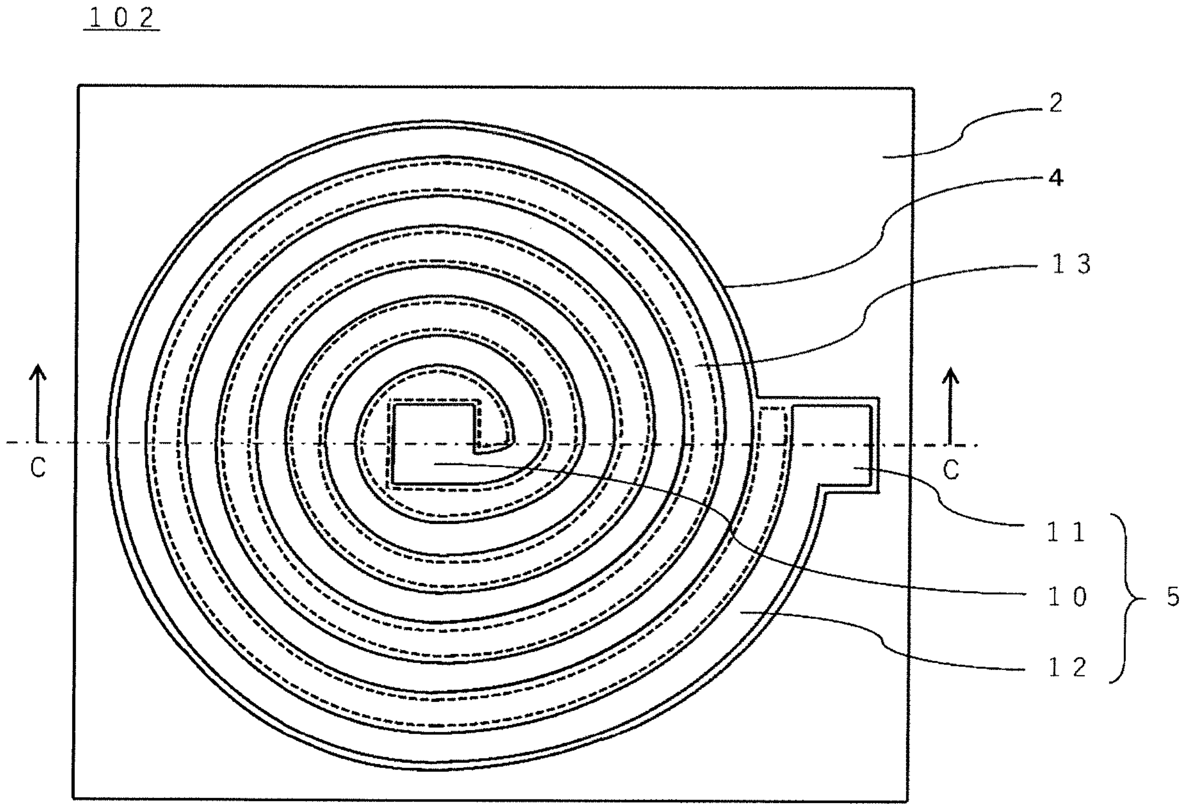
FIG. 16 is a plan view of an insulating-type coil device of a second embodiment.
Figure 17:
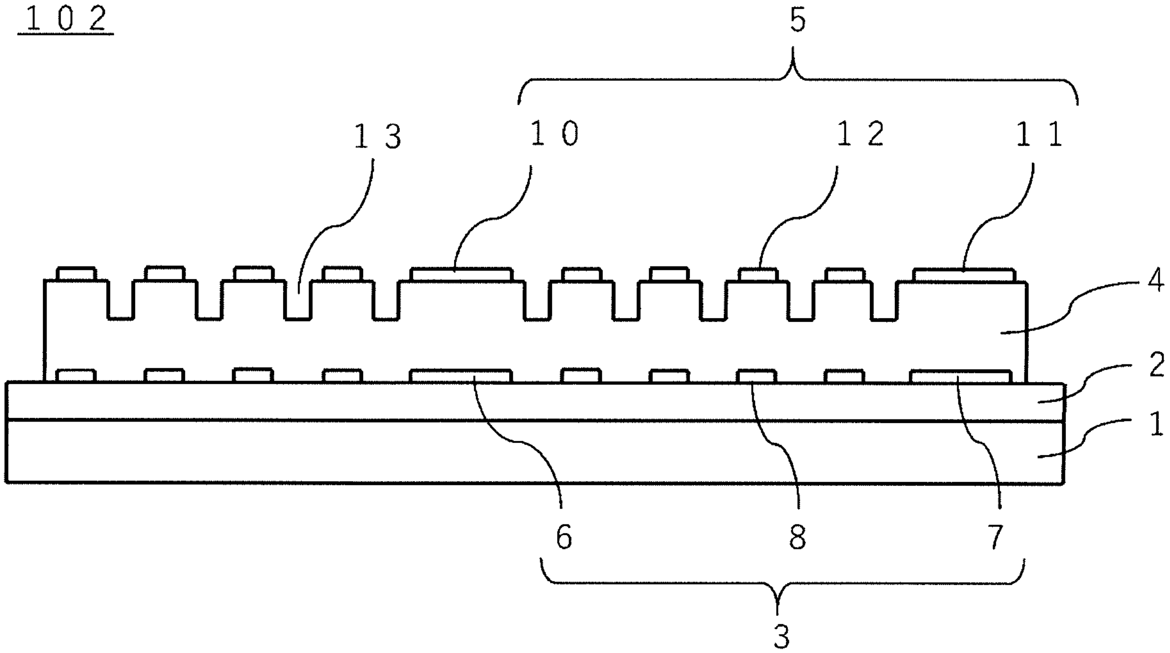
FIG. 17 is a cross-sectional view of the insulating-type coil device of FIG. 16.

FIG. 16 shows a plan view of the insulating-type coil device 102 being a semiconductor device of the second embodiment. Also, FIG. 17 shows a cross-sectional view of the cross section taken along the line C-C in FIG. 16 of the insulating-type coil device 102. As shown in FIG. 16 and FIG. 17, similarly to the insulating-type coil device 101 of the first embodiment, the insulating-type coil device 102 includes: the first insulating film 2 provided on the upper surface of the substrate 1; the primary coil 3 being a conductive film formed in a spiral shape and in contact with the upper surface of the first insulating film 2; the second insulating film 4 covering the upper surface side of the primary coil 3 and in contact with the upper surface of the first insulating film 2 where the first coil part 8 is not provided; and the secondary coil 5 being a conductive film formed in a spiral shape and in contact with the upper surface of the second insulating film 4. Further, similarly to the first embodiment, in the insulating-type coil device 102, the groove 13 being the first groove arranged inside the outer peripheral edge of the second coil part 12 is provided on the upper surface of the second insulating film 4 between the adjacent conductive film of the second coil part 12 in cross-sectional views. However, different from the first embodiment, the groove 13 is formed in a spiral shape between the adjacent conductive film on the inner side and on the outer side of the spiral shape of the second coil part 12 in plan view. Note that the groove 13 may be divided in the middle as long as it has a spiral shape. Also, in the insulating-type coil device 102, the outer shape of the second insulating film 4 extends along the outer peripheral edge of the second coil part 12.

A manufacturing method of the insulating-type coil device 102 in the second embodiment is the same with the manufacturing method shown in the first embodiment, but with following two modifications. The first modification is that the outer shape of the second insulating film 4 is formed in a shape extending along the outer peripheral edge of the second coil part 12 instead of a rectangle in the second insulating film forming process of Step 3. For this purpose, the photomask used in the process of Step 3 is changed to a corresponding one. The second modification is that the spiral-shaped groove 13 is formed instead of the grooves 9 parallel to X direction or Y direction in the groove forming process of Step 4. For this purpose, the photomask used in the process of Step 4 is changed to a corresponding one.

Next, operations and effects of the insulating-type coil device 102 in the second embodiment are described. In the insulating-type coil device 102, since the spiral-shaped groove 13 is formed between the conductive film adjacent in cross-sectional views of the second coil part 12, in addition that the average thickness of the second insulating film 4 is further decreased, the upper surface of the second insulating film 4 can be finely divided according to the number of the winding of the second coil part 12. Accordingly, effects that the shrinkage stresses of the second insulating film 4 are further reduced and dispersed, and the deformation is suppressed are obtained. Also, by making the outer shape of the second insulating film 4 extend along the outer peripheral edge of the second coil part 12, the shrinkage stresses generated in the region of the second insulating film 4 outside the outer peripheral edge of the second coil part 12 can be reduced. As a result, effects that the shrinkage of the flat region on which the secondary coil 5 can be provided can be suppressed, the increase of the size of the device is suppressed, and downsizing is enabled are obtained.

Third Embodiment

Figure 18:
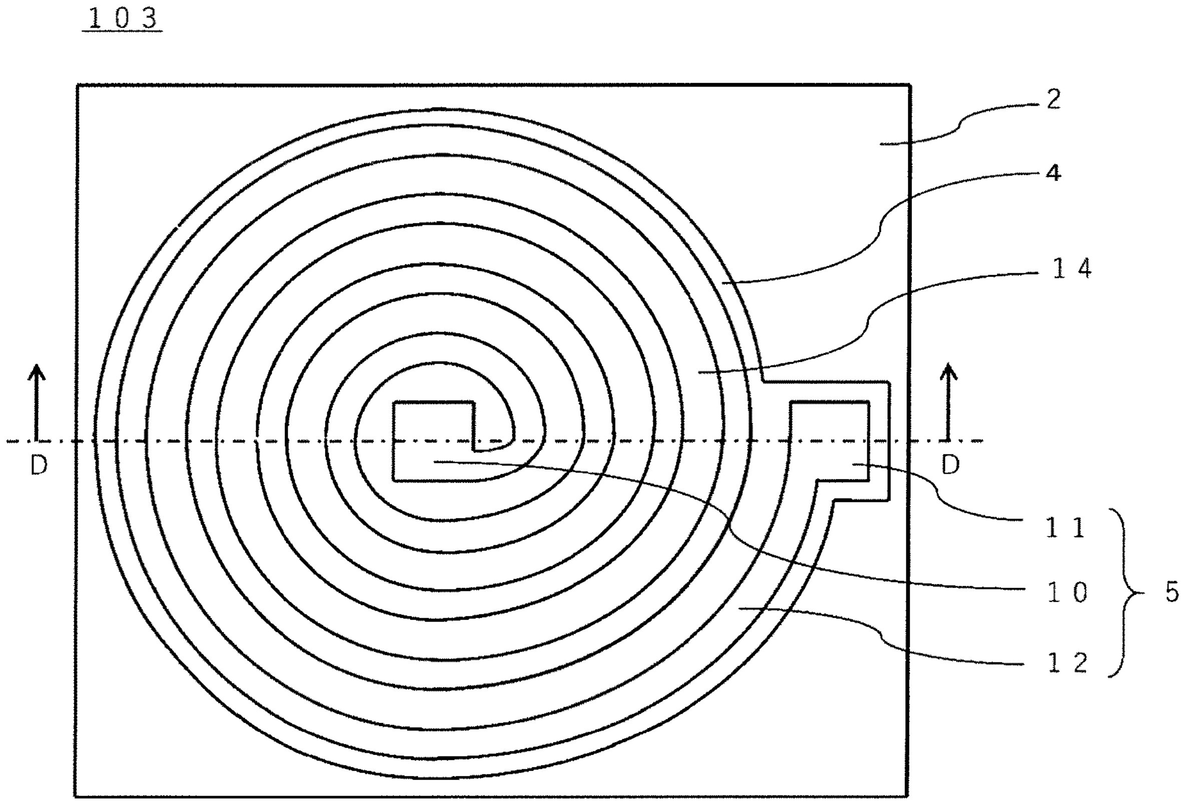
FIG. 18 is a plan view of an insulating-type coil device of a third embodiment.
Figure 19:
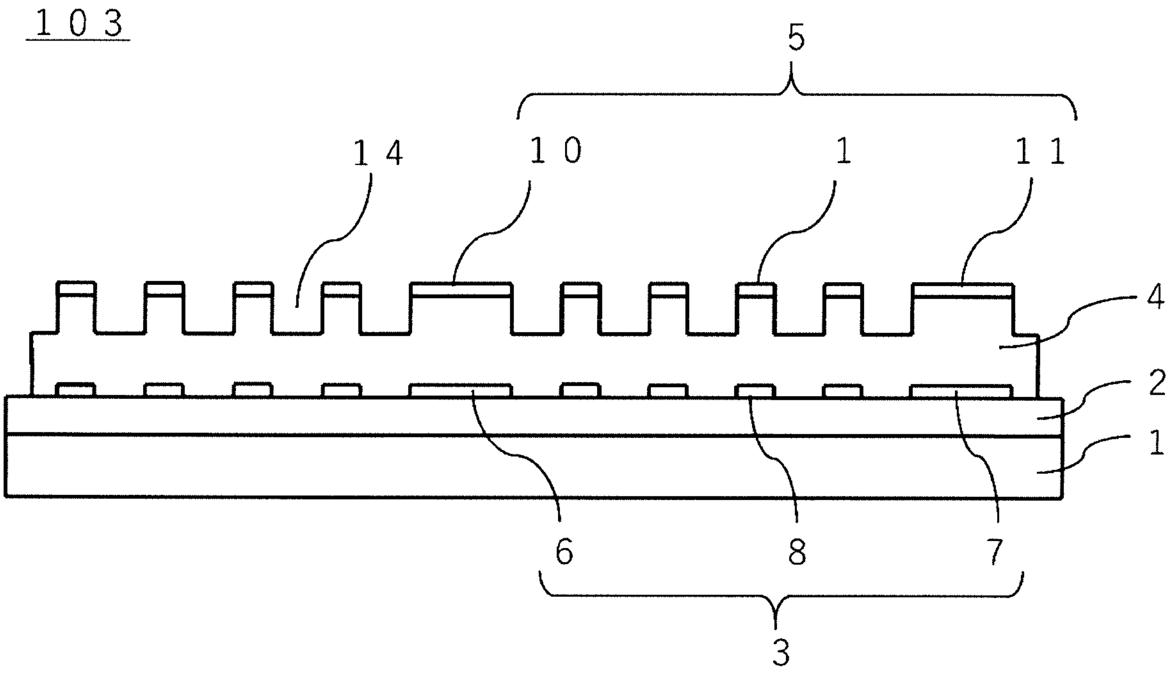
FIG. 19 is a cross-sectional view of the insulating-type coil device of FIG. 18.

An insulating-type coil device 103 being a semiconductor device of the third embodiment is described. The third embodiment is a modification example of the second embodiment. FIG. 18 shows a plan view of the insulating-type coil device 103. Also, FIG. 19 shows a cross-sectional view of the cross section taken along the line D-D in FIG. 18 of the insulating-type coil device 103. In the insulating-type coil device 103, the groove 14 being the first groove arranged inside the outer peripheral edge of the second coil part 12 is formed in the region between the adjacent conductive film on the inner side and on the outer side of the spiral shape of the second coil part 12 in plan view, and the outer shape of the second insulating film 4 extends along the outer peripheral edge of the second coil part 12. In the third embodiment, the manufacturing process of the groove 14 and the secondary coil 5 is different from that in the second embodiment. Accordingly, as shown in FIG. 19, the width of the groove 14 in a direction perpendicular to the first direction in the cross-sectional view is equal to the width between the adjacent conductive film of the second coil part 12 in the direction perpendicular to the first direction.

Figure 20:
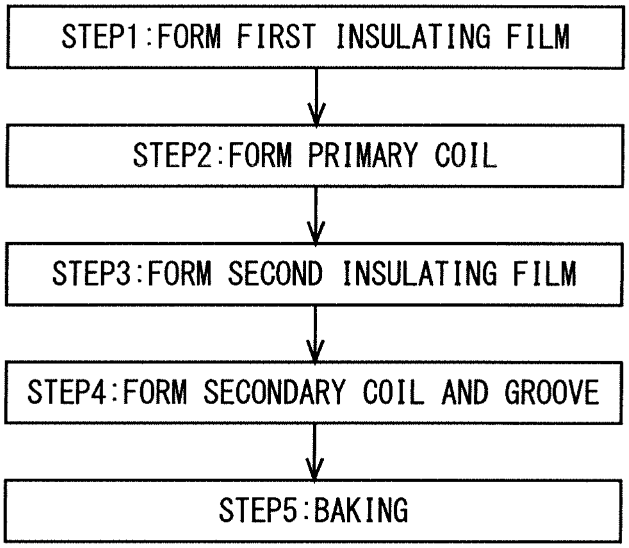
FIG. 20 is a flowchart showing a part of a manufacturing method of the insulating-type coil device of the third embodiment.

A manufacturing method of the insulating-type coil device 103 according to the third embodiment is described. FIG. 20 shows a manufacturing flow. Also, FIGS. 21 to 29 correspond to the cross section of the insulating-type coil device 103 shown in FIG. 19 and are cross-sectional views showing cross sections of the same part in each manufacturing process.

Figure 21:
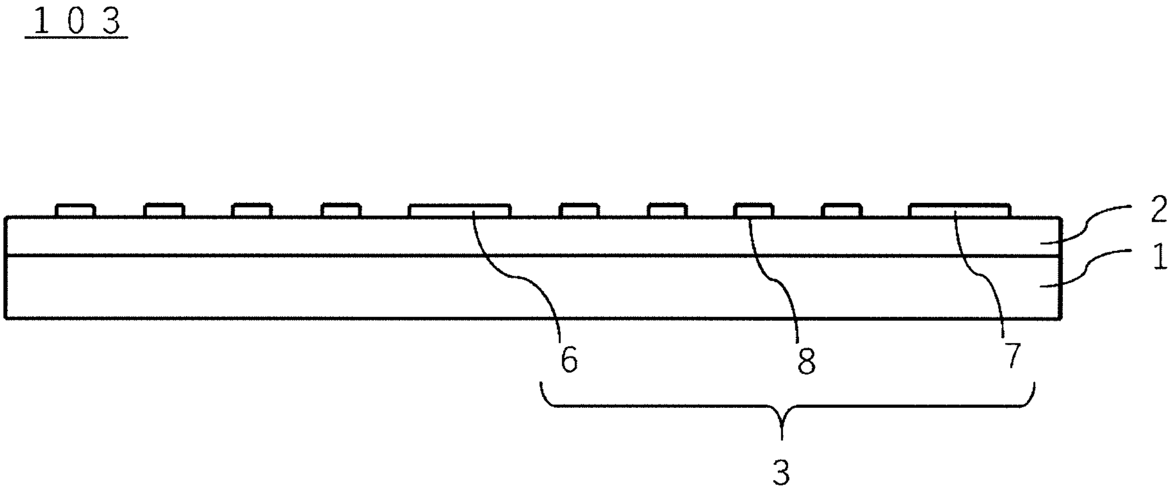
FIG. 21 is a cross-sectional view of the insulating-type coil device in a primary coil forming process of the third embodiment.

In Step 1, the first insulating film 2 is formed on one surface of the substrate 1. Next, in Step 2, the primary coil 3 is formed on the first insulating film 2. FIG. 21 is a cross-sectional view showing the cross section of the insulating-type coil device 103 after performing Step 2. Detailed description of Steps 1 and 2 are omitted since the manufacturing process of Steps 1 and 2 are similar to Steps 1 and 2 in the first embodiment.

Figure 22:
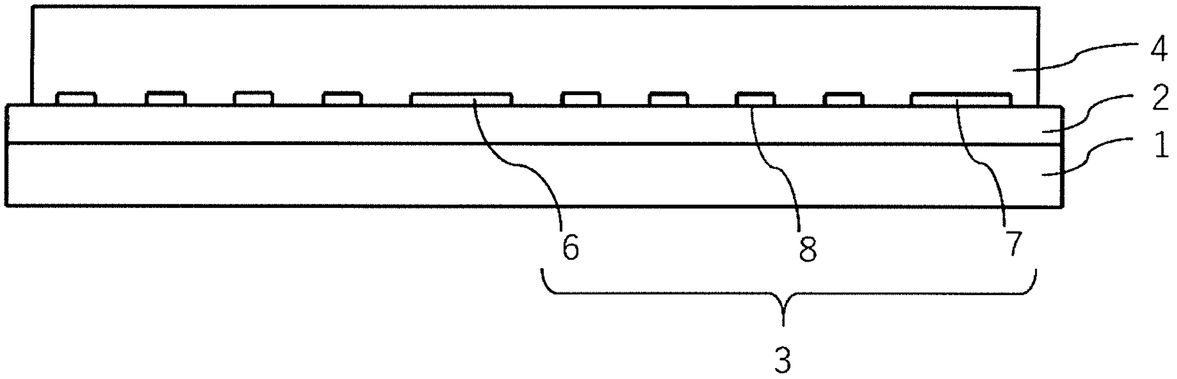
FIG. 22 is a cross-sectional view of the insulating-type coil device in a second insulating film forming process of the third embodiment.

Next, in Step 3, the second insulating film 4 is formed on the upper surface of the first insulating film 2, on which the primary coil 3 is formed. FIG. 22 is a cross sectional view showing the cross section of the insulating-type coil device 103 after performing Step 3. The manufacturing process in Step 3 is similar to that in Step 3 in the first embodiment, however, as in the case of the second embodiment, the outer shape of the second insulating film 4 is formed in a shape extending along the outer peripheral edge of the second coil part 12 instead of a rectangle. For this purpose, the photomask used in Step 3 is changed to a corresponding one.

Next, in Step 4, the secondary coil 5 and the groove 14 are formed on the upper surface of the second insulating film 4. Since this Step 4 is different from that in the first embodiment and the second embodiment, Step 4 will be described in detail below by using figures.

Figure 23:
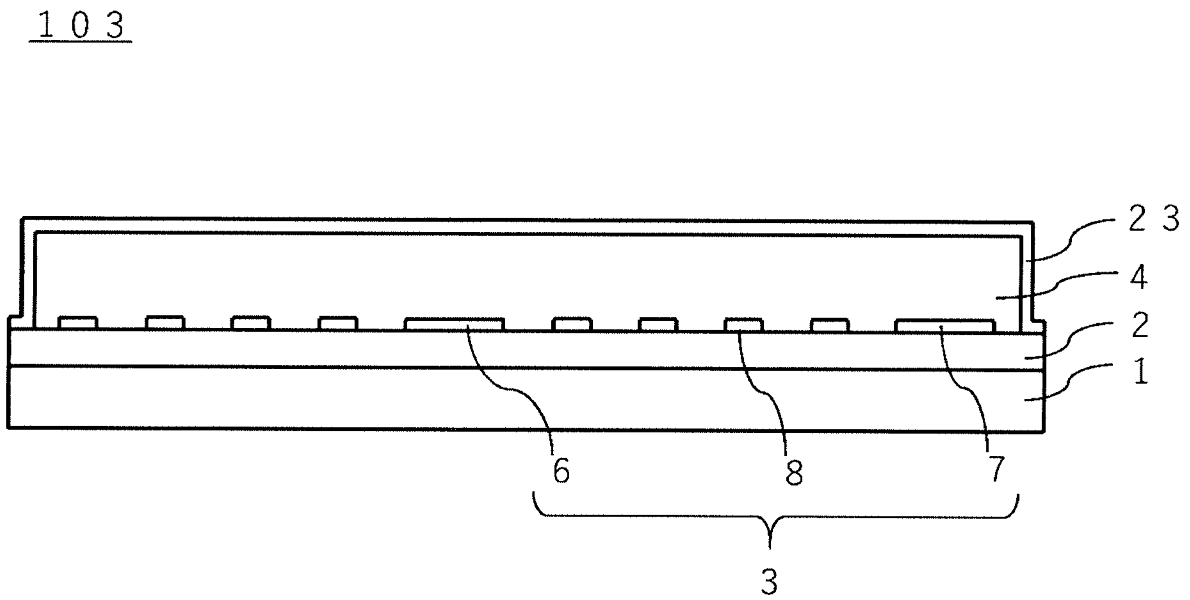
FIG. 23 is a cross-sectional view of the insulating-type coil device in a secondary coil and groove forming process of the third embodiment.

First, a conductive film 23 of aluminum, copper or the like to be a member of the secondary coil 5 is formed on the entire upper surface of the insulating-type coil device 103 by using a sputtering device, for example (see FIG. 23).

Figure 24:
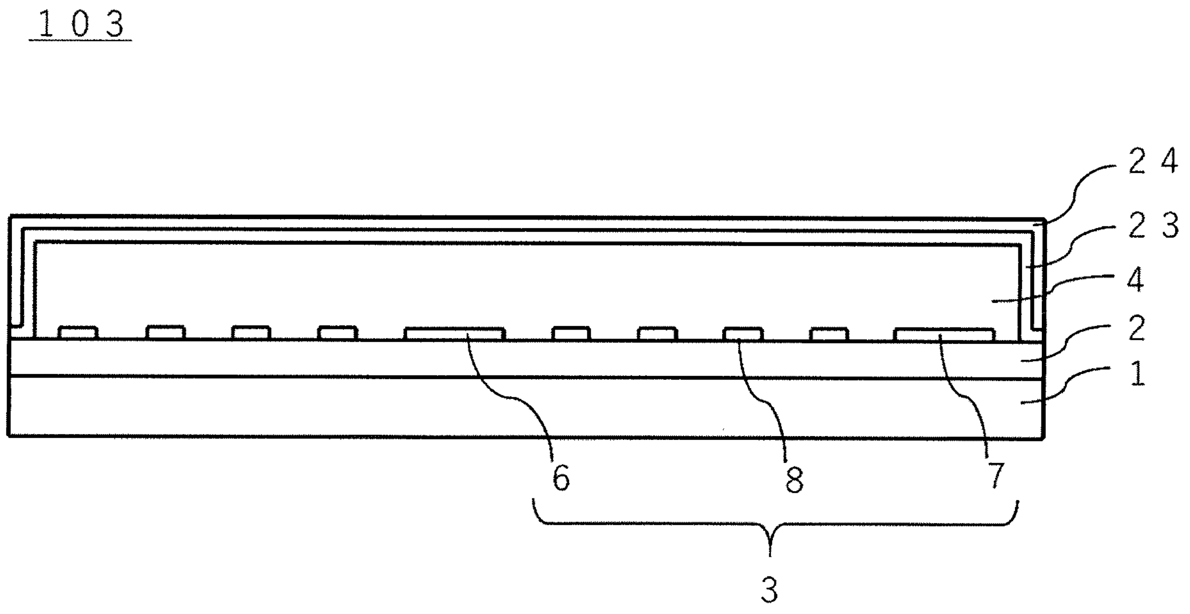
FIG. 24 is a cross-sectional view of the insulating-type coil device in the secondary coil and groove forming process of the third embodiment.
Figure 25:
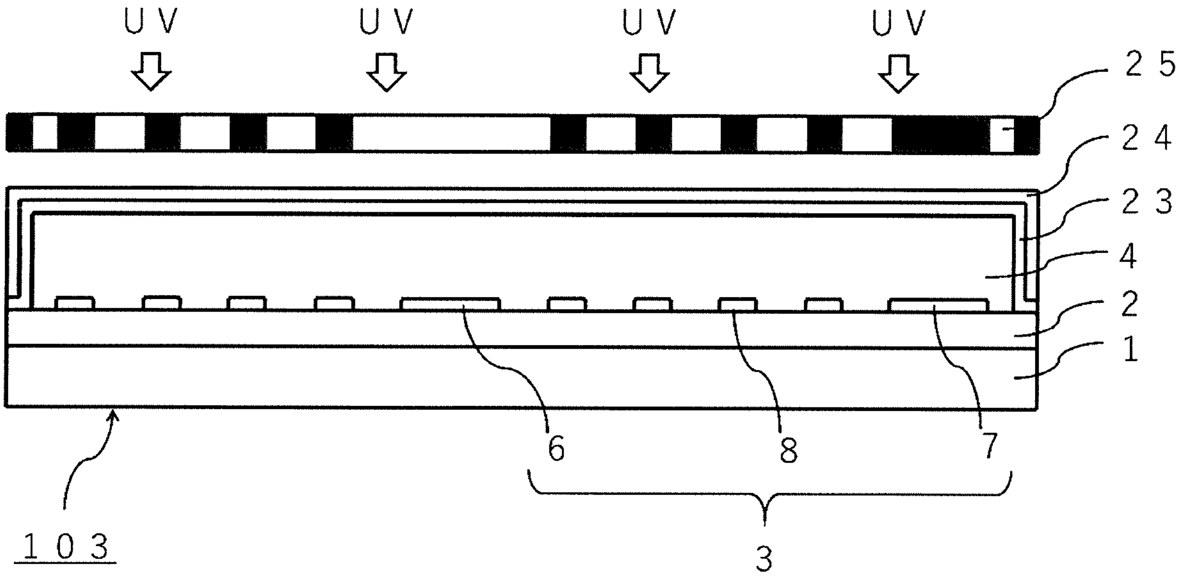
FIG. 25 is a cross-sectional view of the insulating-type coil device in the secondary coil and groove forming process of the third embodiment.
Figure 26:
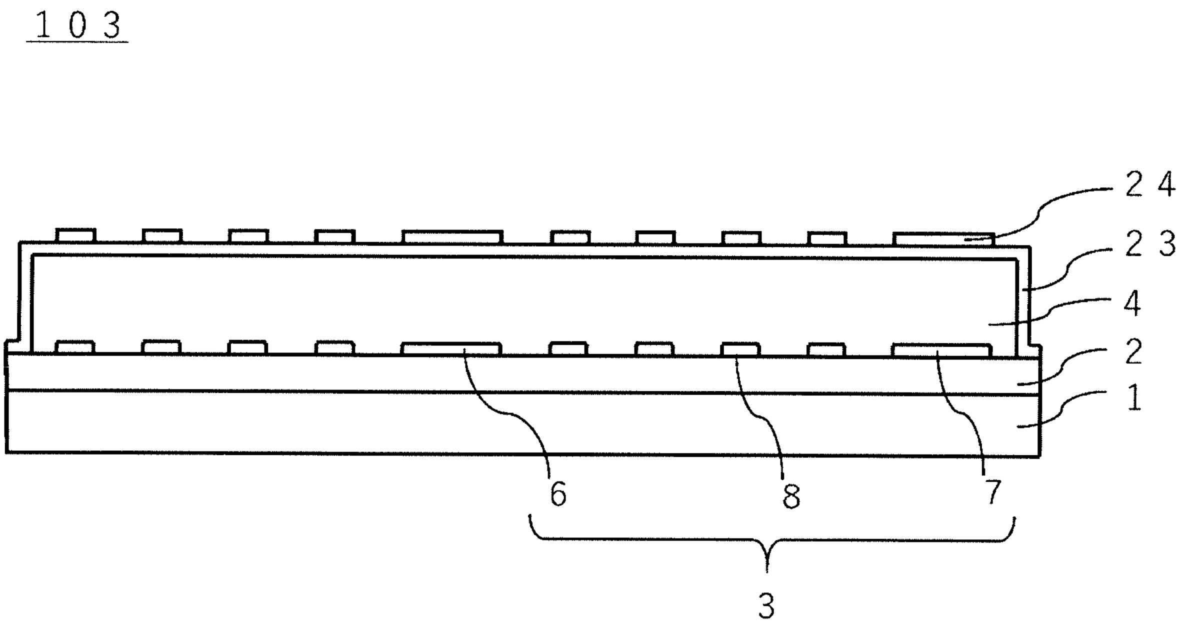
FIG. 26 is a cross-sectional view of the insulating-type coil device in the secondary coil and groove forming process of the third embodiment.
Figure 27:
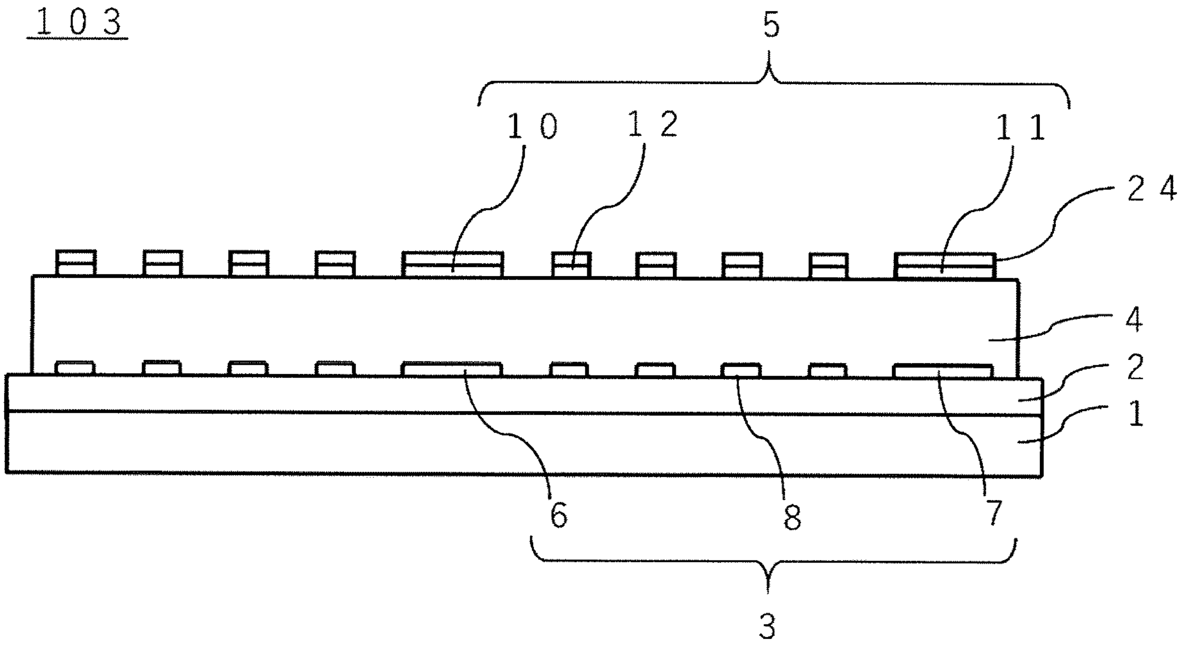
FIG. 27 is a cross-sectional view of the insulating-type coil device in the secondary coil and groove forming process of the third embodiment.
Figure 28:
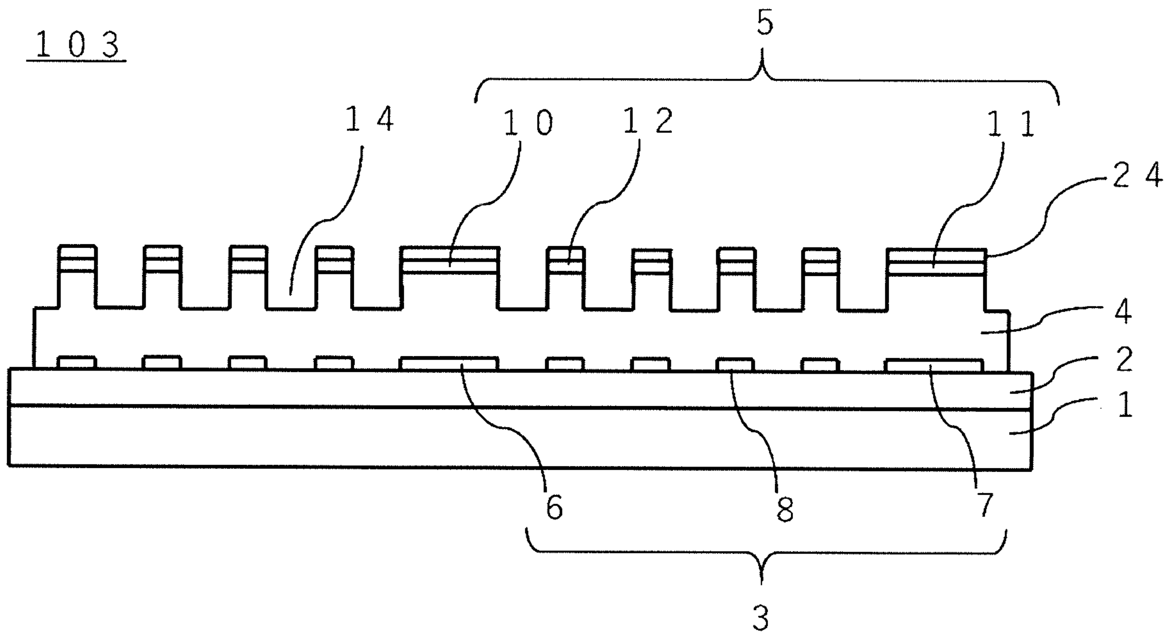
FIG. 28 is a cross-sectional view of the insulating-type coil device in the secondary coil and groove forming process of the third embodiment.
Figure 29:
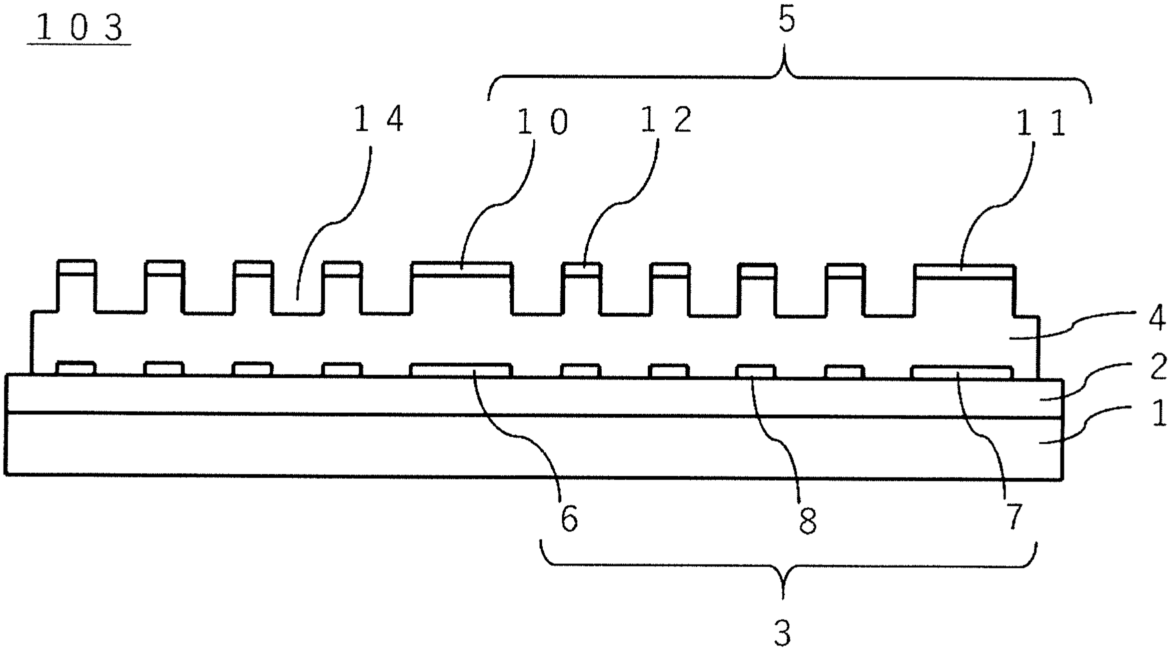
FIG. 29 is a cross-sectional view of the insulating-type coil device in the secondary coil and groove forming process of the third embodiment.

Next, photosensitive resist 24 is applied on the entire upper surface of the conductive film 23 (see FIG. 24). Then, the resist 24 is exposed to light by using a photomask 25 in which a pattern of the secondary coil 5 is formed. Subsequently, the resist 24 is developed and the resist 24 in the region irradiated with the light is removed (see FIG. 26).

Next, in a first etching process, the conductive film 23 in the region where the resist 24 has been removed is removed. As a result, the secondary coil 5 is formed of the conductive film 23 which has not been removed. In the etching performed in this first etching process, the second insulating film 4 is not removed. Accordingly, the second insulating film 4 is exposed in the region other than the region where the conductive film 23 has become the secondary coil 5 in plan view.

Next, in a second etching process, the upper surface of the second insulating film 4 in the region where the resist 24 has been removed is dug to form the groove 14. Note that in the etching performed in the second etching process, the conductive film 23 of the secondary coil 5 is not removed. Accordingly, the width of the groove 14 is equal to the dimension between the adjacent conductive film of the second coil part 12 in the cross-sectional view (see FIG. 28). Subsequently the resist 24 is removed (see FIG. 29).

At last, the second insulating film 4 is cured by performing baking as Step 5. The cross section of the insulating-type coil device 103 after the baking is the same as that shown in FIG. 29. This baking process of Step 5 is the same as Step 6 in the first embodiment.

In the third embodiment, as in the case of the second embodiment, effects that the shrinkage stresses of the second insulating film 4 are further reduced and dispersed and that the deformation is suppressed are obtained by the formation of the spiral-shaped groove 14 between the adjacent conductive film of the second coil part 12. Also, by making the outer shape of the second insulating film 4 extend along the outer peripheral edge of the second coil part 12, the shrinkage stresses of the second insulating film 4 from the outside of the secondary coil 5 are reduced. As a result, effects that the region on which the secondary coil 5 cannot be provided can be reduced and that downsizing of the device is enabled are obtained. In addition to the above described effects, by modifying the forming processes of the secondary coil 5 and the groove 14, compared to the first and second embodiments, the number of times of applying the results, the exposure to light, and the development process in the formations of the secondary coil 5 and the groove 14 are reduced from two to one, and also the photomasks used can be reduced from two sets to one set, and thus effects of reducing the production period and the manufacturing cost are obtained.

Note that different processes from the above-described process results in similar results. For example, a first method is to simultaneously etch the conductive film 23 and the second insulating film 4 in the region where the resist 24 is not formed in the first etching. For this purpose, the first etching is performed by the process in which both of the conductive film 23 and the second insulating film 4 can be etched. In this method, a second etching process is not needed. Also, a second method is to remove the resist 24 after forming the secondary coil 5 in the first etching process at first. And then, the second etching of the second insulating film 4 is performed by using the secondary coil 5 formed of the conductive film 23 as an alternative of the resist. By performing the second etching by a process in which the conductive film 23 is not removed, similar embodiment is realized by this process. Optimal one of these processes may be adopted depending on the types of the materials of the conductive film 23 and the second insulating film 4, specification or ability of the manufacturing devices, or costs required for the processes.

Fourth Embodiment

Figure 30:
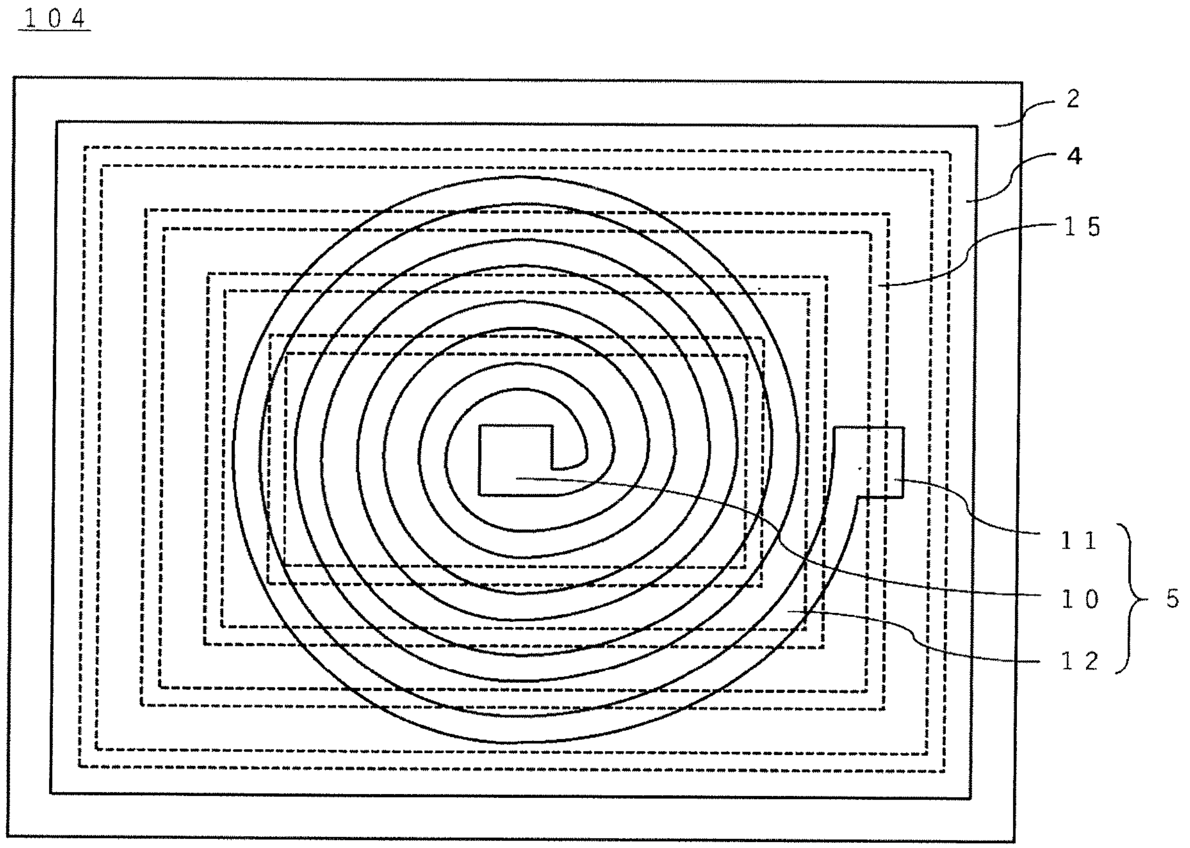
FIG. 30 is a plan view of an insulating-type coil device of a fourth embodiment.

An insulating-type coil device 104 being a semiconductor device of the fourth embodiment is described. FIG. 30 shows a plan view of the insulating-type coil device 104. As shown in FIG. 30, as in the case of the first embodiment, the insulating-type coil device 104 includes: the substrate 1; the first insulating film 2 provided on one surface of the substrate 1; the primary coil 3 formed of a conductive film on the upper surface of the first insulating film 2; the second insulating film 4 formed to cover the primary coil 3 and the region of the upper surface of the first insulating film 2 where the primary coil 3 is not provided; and the secondary coil 5 formed of the conductive film on the upper surface of the second insulating film 4. Further, in the fourth embodiment, grooves 15 are provided on the upper surface of the second insulating film 4, the grooves 15 serving as both of the first grooves arranged inside the outer peripheral edge of the second coil part 12 and the second grooves arranged outside the outer peripheral edge of the second coil part 12. Although a plurality of grooves 15 are arranged in FIG. 30, there may be one groove 15. The second coil part 12 of the secondary coil 5 is provided to straddle steps between the upper surface of the second insulating film 4 where the grooves 15 are not provided and the bottom surface of the grooves 15.

In the fourth embodiment, since the second coil part 12 is formed to straddle the steps of the grooves 15, countermeasures such as increasing the width in the first direction of the second coil part 12 or reducing the width in the first direction of the grooves 15 may be taken, in order to suppress disconnection in the step parts or increase in resistance due to thinning. For example, the width in the first direction of the second coil part 12 may be equal to or larger than the width in the first direction of the grooves 15.

In the fourth embodiment, as in the case of the first embodiment, by arranging the grooves 15 inside the outer peripheral edge of the second coil part 12 as well, effects of reducing and dispersing the shrinkage stresses become larger, and the deformation of the second insulating film 4 is suppressed. Further in the fourth embodiment, the grooves 15 can be arranged independent of the shape of the secondary coil 5. For example, the shape and the width of the grooves 15 may be freely changed to beneficial ones from viewpoints of manufacturing efficiency and cost.

In FIG. 30 of the fourth embodiment, the shape of the second insulating film 4 is a rectangle having sides parallel to X direction and Y direction in plan view. Also, the grooves 15 are provided to extend in X direction and Y direction. However, the shape of the second insulating film 4 is not limited to rectangles and may be arbitrary. Also, in a case where the shape of the second insulating film 4 is any shape including rectangles, the shrinkage stressed pointing from the outer peripheral edge of the second insulating film 4 to the center part of the second insulating film 4 is dispersed and the deformation of the second insulating film 4 is further suppressed if the grooves 15 have a part extending parallel to the outer peripheral edge of the second insulating film 4 closest to the grooves 15 in plan view.

Note that in the first to fourth embodiments, the first coil part 8 and the second coil part 12 are not limited to circles as long as they work as coils and as long as they are spirals. Also, in addition to spirals, circles, polygons, or shapes of combinations of circles and polygons might be adopted. Also, the shapes of the first coil part 8 and the second coil part 12 may be different. Further, although the first electrode 6 and the third electrode 10 are arranged in the center parts of the first coil part 8 and the second coil part 12 respectively and the second electrode 7 and the fourth electrode 11 are arranged in the outer peripheral parts of the spiral shapes of the first coil part 8 and the second coil part 12 respectively, their positions are not limited thereto as long as the first electrode 6 and the second electrode 7, and the third electrode 10 and the fourth electrode 11, are electrically connected respectively via the first coil part 8 and the second coil part 12.

Also, the grooves in each of the embodiments may be combined inside and outside the outer peripheral edge of the second coil part 12. Namely, the first grooves arranged inside the outer peripheral edge of the second coil part 12 and the second grooves arranged outside the outer peripheral edge of the second coil part 12 in each of the embodiments may be combined.

An example of such combinations of the first grooves and the second grooves is described. In the first embodiment, the outer shape of the second insulating film 4 is a rectangle, and the grooves 9B being the second grooves are arranged outside the second coil part 12. Also, in the second embodiment, the second insulating film 4 extends along the outer peripheral edge of the second coil part 12, and the spiral-shaped groove 13 being the first groove is arranged inside the outer peripheral edge of the second coil part 12. For example, by combining these, the outer shape of the second insulating film 4 may be a rectangle having sides in X direction and Y direction, the groove 13 being the spiral-shaped first groove may be arranged in the region inside the second coil part 12, whereas the grooves 9B being second grooves parallel to X direction or Y direction in the region outside the second coil part 12.

Also, another example of the combinations of the first grooves and the second grooves is described. For example, in the configurations shown in the first embodiment and the fourth embodiment, the outer shape of the second insulating film 4 may be changed to extend along the second coil part 12. In this case, since the second insulating film 4 does not exist in the region outside the second coil part 12, the second grooves also do not exist as in the cases of the second embodiment and the third embodiment.

Although some preferred embodiments of the present disclosure have been described, these preferred embodiments are presented as examples. Various omissions, replacements, and changes can be made without departing from the gist. In addition, each preferred embodiment can be combined. The scope of the present invention is shown not in the foregoing description but in the claims, and it is intended that all modifications that come within the meaning and range of equivalence to the claims are embraced here.

While the disclosure has been shown and described in detail, the foregoing description is in all aspects illustrative and not restrictive. It is therefore understood that numerous modifications and variations can be devised.

What is claimed is:

1. A coil device comprising:

a substrate having a first main surface and a second main surface opposed to the first main surface;

a first insulating film provided in contact with a first direction side of the substrate, with the first direction being a direction from the second main surface to the first main surface;

a first coil part provided in contact with a first direction side of the first insulating film and being a spiral-shaped conductive film in a plan view seen from a direction opposite to the first direction;

a second insulating film provided to cover a first direction side of the first coil part and the first direction side of the first insulating film where the first coil part is not provided;

a second coil part being a spiral-shaped conductive film in the plan view and provided in contact with a first direction side of the second insulating film; and at least one first groove provided on the second insulating film in a region inside an outer peripheral edge of the second coil part in the plan view and having a width in the first direction on a surface on the first direction side of the second insulating film, the width being less than a width in the first direction of the second insulating film.

2. The coil device according to claim 1, wherein the at least one first groove is arranged between the adjacent conductive film of the second coil part in a cross-sectional view of the substrate.

3. The coil device according to claim 1, wherein the at least one first groove and the second coil part are provided in positions not overlapping with each other in the plan view.

4. The coil device according to claim 1, wherein the second insulating film has an outer shape of a rectangle composed of sides in a second direction parallel to the first main surface and sides in a third direction perpendicular to the second direction in the plan view, and wherein the at least one first groove has a straight part extending parallel to at least one of the second direction and the third direction.

5. The coil device according to claim 1, wherein each first groove of the at least one first groove has a part extending parallel to a part of the outer peripheral edge of the second insulating film closest to the first groove in the plan view.

6. The coil device according to claim 1, wherein the at least one first groove is spiral-shaped in the plan view.

7. The coil device according to claim 6, wherein a width in a direction perpendicular to the first direction of the at least one first groove in a cross-sectional view is equal to a width in a direction perpendicular to the first direction between the adjacent conductive film of the second coil part.

8. The coil device according to claim 1, wherein the second coil part is arranged to straddle a step between the surface on the first direction side of the second insulating film in a region where the at least one first groove is not provided and a bottom surface of the at least one first groove in the plan view.

9. The coil device according to claim 8, wherein each first groove of the at least one first groove has a part extending parallel to a part of the outer peripheral edge of the second insulating film closest to the first groove in the plan view.

10. The coil device according to claim 8, wherein a width in the first direction of the second coil part is equal to or larger than the width in the first direction of the at least one first groove.

11. A coil device comprising:

a substrate having a first main surface and a second main surface opposed to the first main surface;

a first insulating film provided in contact with a first direction side of the substrate, with the first direction being a direction from the second main surface to the first main surface;

a first coil part provided in contact with a first direction side of the first insulating film and being a spiral-shaped conductive film in a plan view seen from a direction opposite to the first direction;

a second insulating film provided to cover a first direction side of the first coil part and the first direction side of the first insulating film where the first coil part is not provided;

a second coil part being a spiral-shaped conductive film in the plan view and provided in contact with a first direction side of the second insulating film;

at least one first groove provided on the second insulating film in a region inside an outer peripheral edge of the second coil part in the plan view and having a width in the first direction on a surface on the first direction side of the second insulating film; and at least one second groove provided on the surface on the first direction side of the second insulating film and having a width in the first direction in a region outside the outer peripheral edge of the second coil part in the plan view.

12. The coil device according to claim 11, wherein the second insulating film has an outer shape of a rectangle composed of sides in a second direction parallel to the first main surface and sides in a third direction perpendicular to the second direction in the plan view, and wherein the at least one second groove has a straight part extending parallel to at least one of the second direction and the third direction.

13. The coil device according to claim 11, wherein each second groove of the at least one second groove has a part extending parallel to a part of the outer peripheral edge of the second insulating film closest to the second groove in the plan view.

14. The coil device according to claim 1, wherein the outer shape of the second insulating film extends along the outer peripheral edge of the second coil part in the plan view.

15. The coil device according to claim 1, wherein the width in the first direction of the at least one first groove is less than or equal to 50% of the width in the first direction of the second insulating film.

16. The coil device according to claim 1, wherein the second insulating film includes polyimide.

* * * * *